(12) United States Patent
Hirano et al.

(10) Patent No.: US 11,163,895 B2
(45) Date of Patent: Nov. 2, 2021

(54) CONCEALMENT DEVICE, DATA ANALYSIS DEVICE, AND COMPUTER READABLE MEDIUM

(71) Applicant: MITSUBISHI ELECTRIC CORPORATION, Tokyo (JP)

(72) Inventors: Takato Hirano, Tokyo (JP); Rina Shimizu, Tokyo (JP); Mitsuhiro Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 16/345,501

(22) PCT Filed: Dec. 19, 2016

(86) PCT No.: PCT/JP2016/087854
§ 371 (c)(1),
(2) Date: Apr. 26, 2019

(87) PCT Pub. No.: WO2018/116366
PCT Pub. Date: Jun. 28, 2018

(65) Prior Publication Data
US 2019/0303593 A1    Oct. 3, 2019

(51) Int. Cl.
*H04L 29/06* (2006.01)
*G06F 21/60* (2013.01)
(Continued)

(52) U.S. Cl.
CPC ............ *G06F 21/606* (2013.01); *G06F 21/60* (2013.01); *G06F 21/62* (2013.01); *H04L 9/0869* (2013.01);
(Continued)

(58) Field of Classification Search
CPC . G06F 21/606; H04L 63/0428; H04L 9/0869; H04L 2209/08
See application file for complete search history.

(56) References Cited

U.S. PATENT DOCUMENTS

| | | | |
|---|---|---|---|
| 2006/0075135 A1* | 4/2006 | Rambhia | H04L 63/0428 709/238 |
| 2006/0085644 A1* | 4/2006 | Isozaki | H04L 9/0844 713/171 |

(Continued)

FOREIGN PATENT DOCUMENTS

| | | |
|---|---|---|
| JP | 2010-093424 A | 4/2010 |
| JP | 2010-231528 A | 10/2010 |

(Continued)

OTHER PUBLICATIONS

Adam et al., "Security-Control Methods for Statistical Databases: A Comparative Study", ACM Computing Surveys, vol. 21, No. 4, Dec. 1989, pp. 515-556.

(Continued)

*Primary Examiner* — David J Pearson
(74) *Attorney, Agent, or Firm* — Birch, Stewart, Kolasch & Birch, LLP

(57) ABSTRACT

A random-number generation unit generates a plurality of random numbers from a plurality of seeds. A data scrambling unit conceals concealment target data which is a concealment target by using the plurality of random numbers generated by the random-number generation unit. A transmission unit transmits concealed data which is the concealment target data concealed by the data scrambling unit to a data analysis device, and transmits any seed among the plurality of seeds to the data analysis device, after transmission of the concealed data to the data analysis device.

12 Claims, 15 Drawing Sheets

(51) Int. Cl.
*H04L 9/08* (2006.01)
*G06F 21/62* (2013.01)
*G06F 7/58* (2006.01)

(52) U.S. Cl.
CPC .......... *H04L 63/0428* (2013.01); *G06F 7/588* (2013.01); *H04L 2209/08* (2013.01); *H04L 2209/16* (2013.01); *H04L 2209/42* (2013.01)

(56) References Cited

U.S. PATENT DOCUMENTS

| | | | |
|---|---|---|---|
| 2010/0254533 A1* | 10/2010 | McCullough | H04W 12/043 380/44 |
| 2012/0059528 A1 | 3/2012 | Umesawa et al. | |
| 2012/0143922 A1 | 6/2012 | Rane et al. | |
| 2012/0163585 A1* | 6/2012 | Choi | H04L 9/002 380/28 |
| 2013/0291128 A1 | 10/2013 | Ito et al. | |
| 2013/0340098 A1 | 12/2013 | Rane et al. | |
| 2014/0137260 A1 | 5/2014 | Wang et al. | |
| 2014/0281572 A1 | 9/2014 | Wang et al. | |
| 2015/0304102 A1* | 10/2015 | Nakano | H04L 9/0668 713/189 |
| 2015/0309089 A1 | 10/2015 | Katsukura et al. | |
| 2016/0171632 A1* | 6/2016 | Tatourian | H04Q 9/00 705/63 |
| 2017/0161519 A1 | 6/2017 | Takahashi | |

FOREIGN PATENT DOCUMENTS

| | | |
|---|---|---|
| JP | 2011-100116 A | 5/2011 |
| JP | 2014-211761 A | 11/2011 |
| JP | 2012-058998 A | 3/2012 |
| JP | 2012-080345 A | 4/2012 |
| JP | 2012-133320 A | 7/2012 |
| JP | 2012-159932 A | 8/2012 |
| JP | 2013-152670 A | 8/2013 |
| JP | 2014-003602 A | 1/2014 |
| JP | 2014-081545 A | 5/2014 |
| JP | 2014-081844 A | 5/2014 |
| JP | 2014-098895 A | 5/2014 |
| JP | 2014-109928 A | 6/2014 |
| JP | 2014-137586 A | 7/2014 |
| JP | 2014-137587 A | 7/2014 |
| JP | 2014-178680 A | 9/2014 |
| JP | 2015-212848 A | 11/2015 |
| JP | 2016-012074 A | 1/2016 |
| JP | 2016-031567 A | 3/2016 |
| WO | WO 2012/063546 A1 | 5/2012 |
| WO | WO 2015/079647 A1 | 6/2015 |

OTHER PUBLICATIONS

Dwork, "Differential Privacy", International Colloquium on Automata, Languages, and Programming, 2006, 12 pages.
International Search Report for PCT/JP2016/087854 (PCT/ISA/210) dated Mar. 7, 2017, with English translation.
Xiao et al., "Optimal Random Perturbation at Multiple Privacy Levels", Very Large Data Base Endowment, 2009, 12 pages.

* cited by examiner

Fig. 15

| DEVICE DATA (D) | | BASIC INFORMATION (B) | PROTECTION TARGET DEVICE LIST (L) |
|---|---|---|---|
| POWER USAGE DATA (P) | TIME DATA (TIME) | | |
| 1000W | JANUARY 1, 2016, AT 0:00 | { (TELEVISION, 100W), (AIR CONDITIONER, 500W), (MICROWAVE OVEN, 600W), (LIGHTNING FOR RESTROOM, 50W), ...} | {TELEVISION, LIGHTNING FOR RESTROOM} |
| 900W | JANUARY 1, 2016, AT 0:01 | { (TELEVISION, 100W), (AIR CONDITIONER, 500W), (MICROWAVE OVEN, 600W), (LIGHTNING FOR RESTROOM, 50W), ...} | {TELEVISION, LIGHTNING FOR RESTROOM} |
| ... | ... | ... | ... |
| 560W | APRIL 1, 2016, AT 0:00 | { (TELEVISION, 100W), (AIR CONDITIONER, 500W), (MICROWAVE OVEN, 600W), (LIGHTNING FOR RESTROOM, 50W), ... (HAIRDRYER, 600W) } | {TELEVISION, LIGHTNING FOR RESTROOM, HAIRDRYER} |
| ... | | ... | ... |

CONCEALMENT DEVICE, DATA ANALYSIS DEVICE, AND COMPUTER READABLE MEDIUM

TECHNICAL FIELD

The present invention relates to concealment of data.

BACKGROUND ART

In recent years, a business that utilizes privacy information has been increasing. For example, privacy information has been utilized for businesses such as a monitoring service for elderly people. In recent years, a HEMS (Home Energy Management System) has been popularized in general households, and activities of individuals can be estimated by analyzing power usage data collected by a smart meter used in the HEMS. That is, by analyzing the privacy information such as power usage data to estimate the activities of elderly people, the monitoring service for the elderly people can be realized.

However, it has a risk of invasion of privacy to estimate the individual activities more than necessary. For example, if the power usage data is analyzed to perform the monitoring service, a period of time during which a particular home electric appliance is being used is known. Therefore, it is understood that a person to be monitored is performing activities related to the home electric appliance in the particular period of time. Further, if the power usage data is analyzed for a long period, an activity pattern of an individual is estimated. Further, as the data analysis technique advances, individual hobbies or preference may be exposed ultimately.

As a technique of avoiding such leakage of privacy information more than necessary, a technique of adding a random number to data has been well known (for example, Non Patent Literature 1, Non Patent Literature 2).

For example, there is a method of protecting privacy by simply adding a random number generated based on Gaussian distribution to original data to convert the original data to data different from the original data. It is known that a technique of protecting privacy by simply adding a random number to the original data has a close relationship with a framework referred to as "differential privacy" recently proposed, with which the privacy level can be evaluated quantitatively. Therefore, the method of adding a random number to the original data has been attracting attention again.

According to the privacy protection technique satisfying the differential privacy, it is difficult to estimate respective values from a statistic value, even if there is much background knowledge relating to data of an individual in a database. Further, according to the privacy protection technique satisfying the differential privacy, a statistical analysis with respect to the entire database is possible.

CITATION LIST

Patent Literature

Patent Literature 1: JP 2016-012074 A
Patent Literature 2: JP 2014-003602 A
Patent Literature 3: JP 2010-093424 A
Patent Literature 4: JP 2014-109928 A
Patent Literature 5: JP 2012-159932 A

Non Patent Literatures

Non Patent Literature 1: N. R. Adam and J. C. Wortman. "Security control methods for statistical databases". ACM Computer Surveys 1989.
Non Patent Literature 2: X. Xiao, Y. Tao, and M. Chen. "Optimal random perturbation at multiple privacy levels". VLDB 2009.
Non Patent Literature 3: C. Dwork. "Differential privacy". ICALP 2006.

SUMMARY OF INVENTION

Technical Problem

Each of the techniques disclosed in Patent Literatures 1 to 5 and techniques disclosed in Non Patent Literatures 1 to 3 is the privacy protection technique based on any of the differential privacy technique, an encoding technique, and a secret sharing technique.

However, in the techniques disclosed in Patent Literatures 1 to 5 and the techniques disclosed in Non Patent Literatures 1 to 3, there is a problem that an accuracy of concealed data that has been concealed cannot be increased stepwisely.

That is, in the techniques disclosed in Patent Literatures 1 to 5 and the techniques disclosed in Non Patent Literatures 1 to 3, the concealed data cannot be approximated to the data before concealment stepwisely. Therefore, there is a problem that an accurate analysis cannot be performed.

Accordingly, when the techniques disclosed in Patent Literatures 1 to 5 and the techniques disclosed in Non Patent Literatures 1 to 3 are applied to the monitoring service described above, an accurate analysis cannot be performed. Therefore, usage conditions of home electric appliances cannot be accurately ascertained and appropriate monitoring cannot be performed.

The present invention has a main object to solve the above problems. That is, the present invention mainly aims to acquire a configuration that can approximate concealed data to data before concealment stepwisely.

Solution to Problem

A concealment device according to the present invention, includes:

a random-number generation unit to generate a plurality of random numbers from a plurality of seeds;

a concealment unit to conceal concealment target data which is a concealment target by using the plurality of random numbers generated by the random-number generation unit; and a transmission unit to transmit concealed data which is the concealment target data concealed by the concealment unit to a data analysis device, and transmit any seed among the plurality of seeds to the data analysis device.

Advantageous Effects of Invention

In the present invention, seeds used for generation of random numbers used for concealment are transmitted to a data analysis device. Therefore, according to the present invention, the data analysis device can restore the random numbers by using the transmitted seeds, and can approximate concealed data to data before concealment stepwisely by using the restored random numbers.

BRIEF DESCRIPTION OF DRAWINGS

FIG. 15 is a diagram illustrating an example of data stored in the data accumulation device according to the first embodiment.

DESCRIPTION OF EMBODIMENTS

Embodiments of the present invention will be explained below with reference to the drawings. In the following descriptions of the embodiments and the drawings, elements denoted by the same reference signs indicate the same or corresponding parts.

First Embodiment

In the present embodiment, a privacy protection system that can be applied to a service that performs monitoring by analyzing an operation history of home electric appliances and individual activities based on the power usage data is described.

In the privacy protection system according to the present embodiment, such control can be executed that activities of an individual are not exposed more than necessary (in other words, if not required for monitoring), while suppressing degradation of data to be analyzed (or while controlling degradation stepwise).

Further, since the interpretation of invasion of privacy is different in individuals, in the privacy protection system according to the present embodiment, privacy information that a user wishes to protect can be flexibly specified.

*Descriptions of Configurations*

Figure 1:
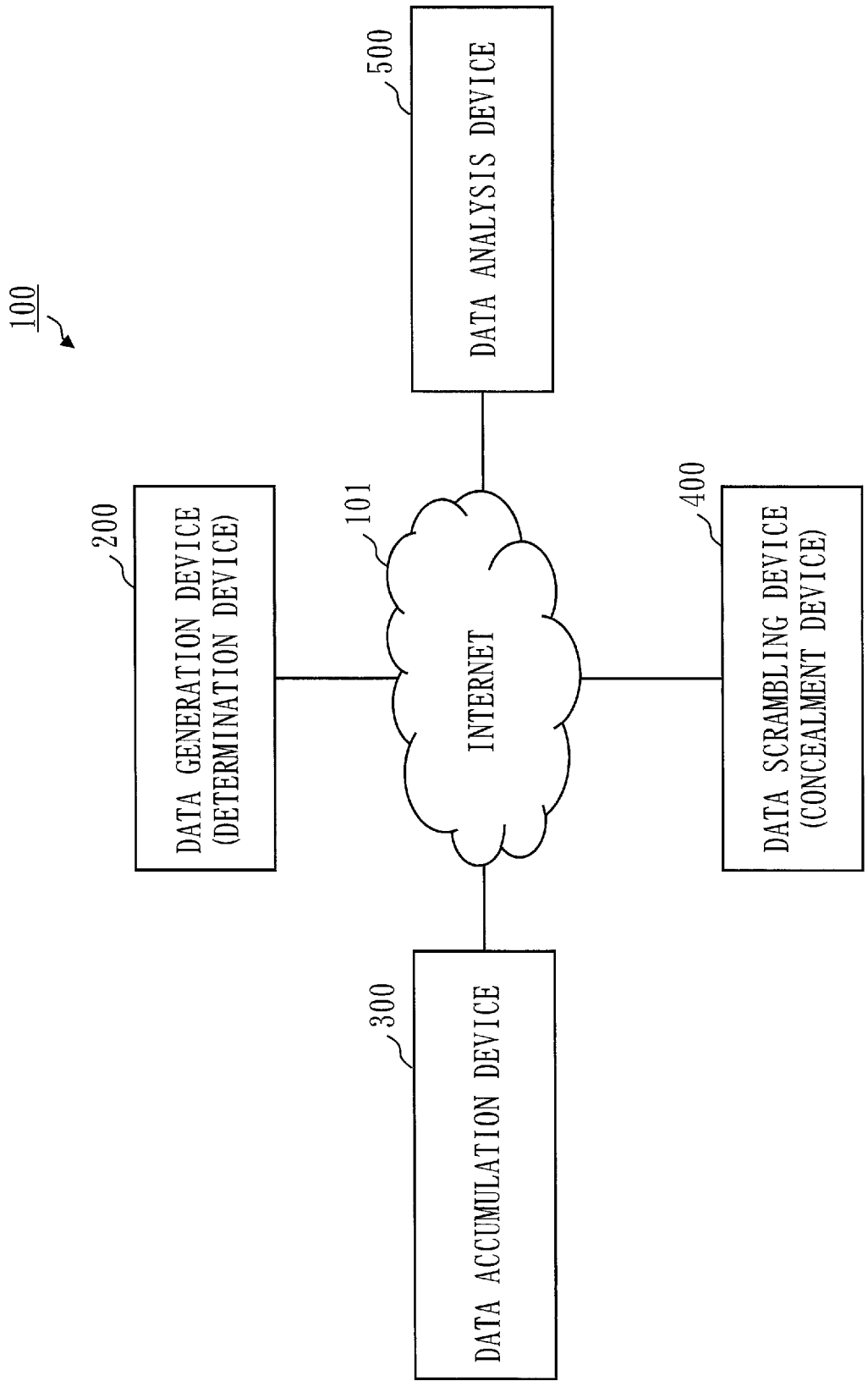
FIG. 1 is a diagram illustrating a configuration example of a privacy protection system according to a first embodiment.

FIG. 1 illustrates a configuration example of a privacy protection system 100 according to the present embodiment.

As illustrated in FIG. 1, the privacy protection system 100 includes a data generation device 200, a data accumulation device 300, a data scrambling device 400, and a data analysis device 500.

The privacy protection system 100 can include a plurality of data generation devices 200. The privacy protection system 100 can include a plurality of data accumulation devices 300. The privacy protection system 100 can also include a plurality of data scrambling devices 400. Further, the privacy protection system 100 can include a plurality of data analysis devices 500.

The internet 101 connects the data generation device 200, the data accumulation device 300, the data scrambling device 400, and the data analysis device 500 to each other.

The Internet 101 is an example of a network. Instead of the Internet 101, other types of networks can be used. For example, the data generation device 200, the data accumulation device 300, the data scrambling device 400, and the data analysis device 500 can be connected to each other by a LAN (Local Area Network).

The data generation device 200 generates data to be analyzed by the data analysis device 500. The data generation device 200 transmits the generated data to the data accumulation device 300. The data generation device 200 generates power usage data acquired, for example, by aggregating pieces of power consumption data of home electric appliances. In this case, the data generation device 200 is, for example, a smart meter. When the data generation device 200 is a smart meter, the data generation device 200 can collect pieces of power consumption data from the home electric appliances which are not illustrated in FIG. 1. In the present embodiment, the power consumption data indicates an amount of power consumed by one certain home electric appliance which is not illustrated in FIG. 1. Further, the power usage data indicates an aggregate value of power consumption of all home electric appliances which are not illustrated in FIG. 1.

In the following descriptions, it is assumed that the data generation device 200 generates power usage data being an aggregate value of power consumption of all home electric appliances which are not illustrated in FIG. 1 and device data (D) including the time when the power usage data is generated.

The power usage data described above corresponds to concealment target data. Further, the power usage data after being concealed by the data scrambling device 400 corresponds to concealed data.

The data generation device 200 transmits basic information related to the device data (D) to the data accumulation device 300. Specifically, the basic information includes types of home electric appliances (for example, a television, a microwave oven and so forth), and the maximum power consumption that can be caused by each of the home electric appliances, being generation sources of the power usage data.

The data generation device 200 generates such basic information and transmits the generated basic information to the data accumulation device 300. In the following descriptions, the basic information is referred to as basic information (B). In many cases, although the same data is continuously generated as the basic information (B), data of the basic information (B) is updated every time the home electric appliances which are not illustrated in FIG. 1, are updated.

The data generation device 200 generates a list defining home electric appliances whose power consumption and operation history are to be concealed as the privacy information, and transmits the generated list to the data accumulation device 300.

Specifically, the data generation device 200 generates a list of home electric appliances whose power consumption and operation history are to be concealed (hereinafter, referred to as protection target devices), based on the power usage acquired by aggregating the power consumption of a plurality of home electric appliances, and transmits the generated list to the data accumulation device 300. In the following descriptions, the list is referred to as protection target device list (L). In the protection target device list (L), names of a single or a plurality of home electric appliances whose power consumption and operation history are to be concealed, are indicated based on the power usage data acquired by aggregating the power consumption of the home electric appliances.

Further, the data generation device 200 requests a change of seeds for generating random numbers. That is, the data generation device 200 requests the data scrambling device 400 to change the seeds of the random numbers. For example, when safety of seeds is compromised, such as when a certain time has passed or when the seeds are intercepted by a malicious person, the data generation device 200 requests the data scrambling device 400 to change the seeds.

Further, the data generation device 200 determines whether to approve disclosure of the seeds of the random number. That is, when a disclosure request of the seeds of the random numbers is transmitted from the data analysis device 500, the data generation device 200 determines whether to approve the disclosure of the seeds. When approving disclosure of the seeds, the data generation device 200 instructs the data scrambling device 400 to disclose the seeds of the random numbers.

The data generation device 200 corresponds to a determination device.

The data accumulation device 300 accumulates pieces of data collected from the data generation device 200. Therefore, the data accumulation device 300 includes a large capacity recording medium.

The data scrambling device 400 adds random numbers to the power usage data to protect the privacy information. That is, when it is necessary to protect the power usage data to be transmitted to the data analysis device 500 as the privacy information, the data scrambling device 400 conceals the power usage data by using random numbers.

Specifically, the data scrambling device 400 receives the device data (D) generated by the data generation device 200 from the data accumulation device 300. When the power usage data to be concealed is included in the device data (D) received from the data accumulation device 300, the data scrambling device 400 adds appropriate random numbers to the power usage data to scramble the power usage data. The data scrambling device 400 transmits the scrambled power usage data to the data analysis device 500.

More specifically, the data scrambling device 400 receives the basic information and the protection target device list (L) generated by the data generation device 200 together with the device data (D) from the data accumulation device 300. In the protection target device list (L), as described above, the home electric appliances whose power consumption and operation history are to be concealed in the power usage data are indicated. The data scrambling device 400 reads all the pieces of maximum power consumption that can be caused by the home electric appliances indicated in the protection target device list (L) from the basic information (B) by referring to the protection target device list (L), to generate random numbers for concealment depending on the largest value among the pieces of maximum power consumption. The data scrambling device 400 generates seeds for generating random numbers prior to generation of the random numbers, and stores the generated seeds.

Further, when there is a request to change the seeds from the data generation device 200, the data scrambling device 400 newly generates seeds, to change the seeds to be used for generation of random numbers. The data scrambling device 400 does not delete the seeds used in the past and continuously stores the seeds used in the past together with the new seeds.

When the data generation device 200 instructs disclosure of the seeds used for scrambling, the data scrambling device 400 transmits the corresponding seeds to the data analysis device 500. When the data generation device 200 specifies a disclosure period, the data scrambling device 400 discloses only the seeds used in the corresponding period to the data analysis device 500.

The data scrambling device 400 corresponds to a concealment device. An operation performed by the data scrambling device 400 corresponds to a concealment method and a concealment program.

The data analysis device 500 analyzes the scrambled power usage data transmitted from the data scrambling device 400. The data analysis device 500 analyzes the scrambled power usage data transmitted from the data scrambling device 400 by using an analysis technique such as a simple threshold method or a hidden Markov model. The data analysis device 500 estimates the user's activities from the power consumption and operation history of home electric appliances other than those indicated in the protection target device list (L) based on an analysis result. Alternatively, the data analysis device 500 analyses the scrambled power usage data transmitted from the data scrambling device 400 by using a presumption model to estimate an attribute (the number of people, area, and the like) having a strong correlation with power demand, and analyzes and estimates the user's activities.

The data analysis device 500 requests the data generation device 200 to disclose the seeds of the random numbers used for scrambling of the power usage data.

An operation performed by the data analysis device 500 corresponds to a data analysis method and a data analysis program.

The data generation device 200, the data accumulation device 300, the data scrambling device 400, and the data analysis device 500 can be collectively realized by one computer. However, in this case, it is necessary to take safety management measures such as access management, so that the power usage data before scrambling is not viewed by the data analysis device 500.

Figure 2:
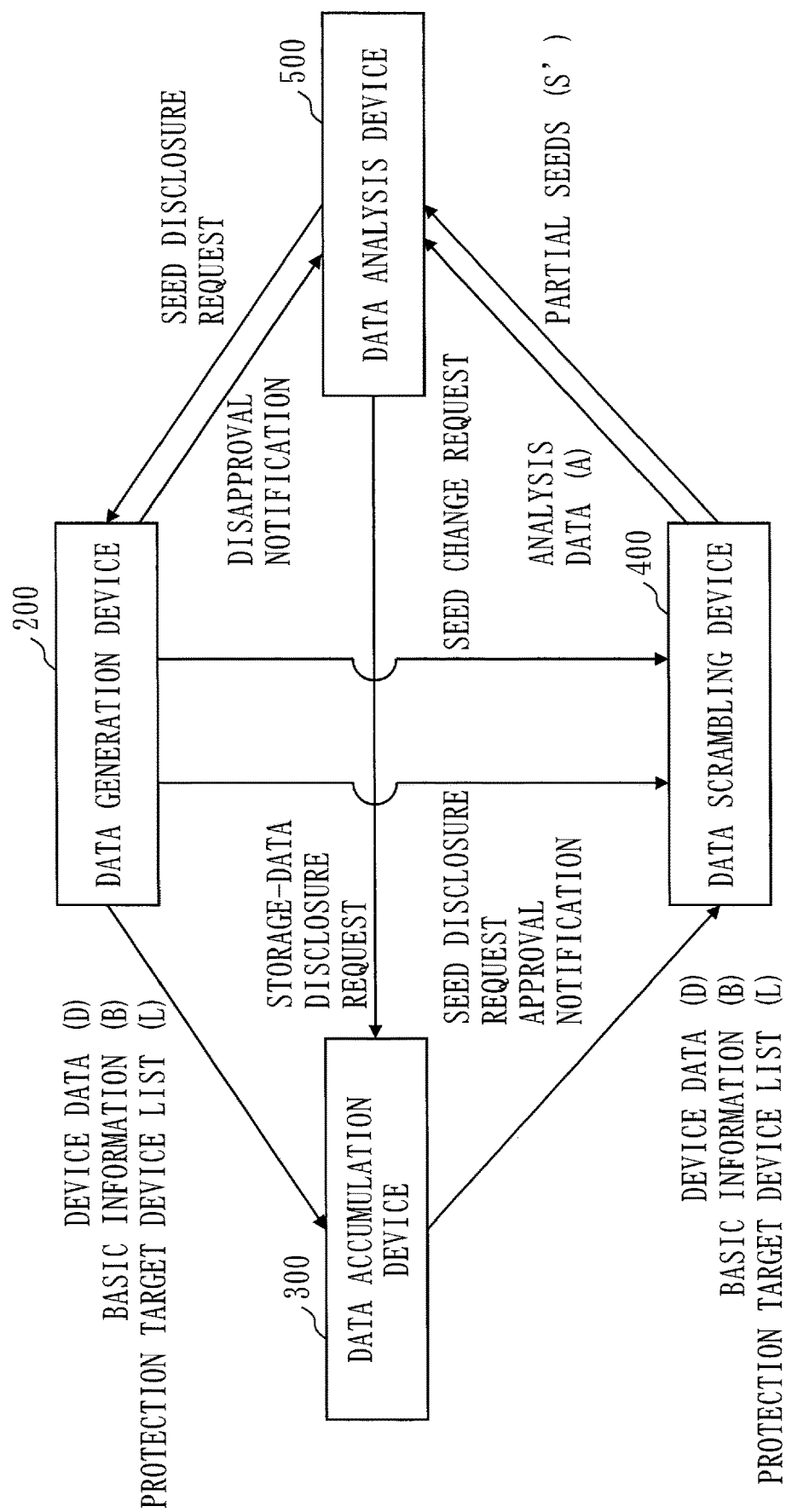
FIG. 2 is a diagram illustrating an example of a data flow in the privacy protection system according to the first embodiment.

FIG. 2 illustrates an example of a data flow in the privacy protection system 100 according to the present embodiment.

The data generation device 200 generates the device data (D), the basic information (B), and the protection target device list (L). The data generation device 200 then transmits the device data (D), the basic information (B), and the protection target device list (L) to the data accumulation device 300.

The data accumulation device 300 stores therein the device data (D), the basic information (B), and the protection target device list (L).

The data analysis device 500 transmits a storage-data disclosure request to the data accumulation device 300. In the storage-data disclosure request, disclosure of the device data (D) to the data analysis device 500 is requested.

The data accumulation device 300 transmits the device data (D), the basic information (B), and the protection target device list (L) to the data scrambling device 400 in response to the storage-data disclosure request.

The data scrambling device 400 refers to the basic information (B) and the protection target device list (L) to scramble the device data (D) by using a plurality of random numbers. The data scrambling device 400 transmits the scrambled device data (D) to the data analysis device 500 as analysis data (A).

The data analysis device 500 analyzes the analysis data (A). When it is necessary to increase the analysis accuracy of the analysis data (A), that is, when it is necessary to partially remove the random numbers from the analysis data (A), the data analysis device 500 transmits a seed disclosure request to the data generation device 200. In the seed disclosure request, disclosure of seeds used for generating random numbers used for scrambling at the time of generating the analysis data (A) is requested.

Upon reception of the seed disclosure request, the data generation device 200 determines whether to disclose the seeds to the data analysis device 500. When disclosing the seeds to the data analysis device 500, the data generation device 200 transmits the seed disclosure request and an approval notification to the data scrambling device 400. When not disclosing the seeds to the data analysis device 500, the data generation device 200 transmits a disapproval notification to the data scrambling device 400.

Upon reception of the seed disclosure request and the approval notification from the data generation device 200, the data scrambling device 400 transmits a part of seeds used for generation of the random numbers used for scrambling at the time of generating the analysis data (A) to the data analysis device 500 as partial seeds (S').

Upon reception of the partial seeds (S') from the data scrambling device 400, the data analysis device 500 restores random numbers from the partial seeds (S'), and uses the restored random numbers to remove the random numbers from the analysis data (A). As a result, the analysis data (A) approaches the power usage data before scrambling and the analysis accuracy increases.

When it is required to change the seeds, the data generation device 200 transmits a seed change request to the data scrambling device 400. In the seed change request, a change of seeds used for generating random numbers is requested.

Upon reception of the seed change request, the data scrambling device 400 newly generates seeds and stores therein the newly generated seeds. The data scrambling device 400 uses the new seeds at the time of generating random numbers next time.

Figure 3:
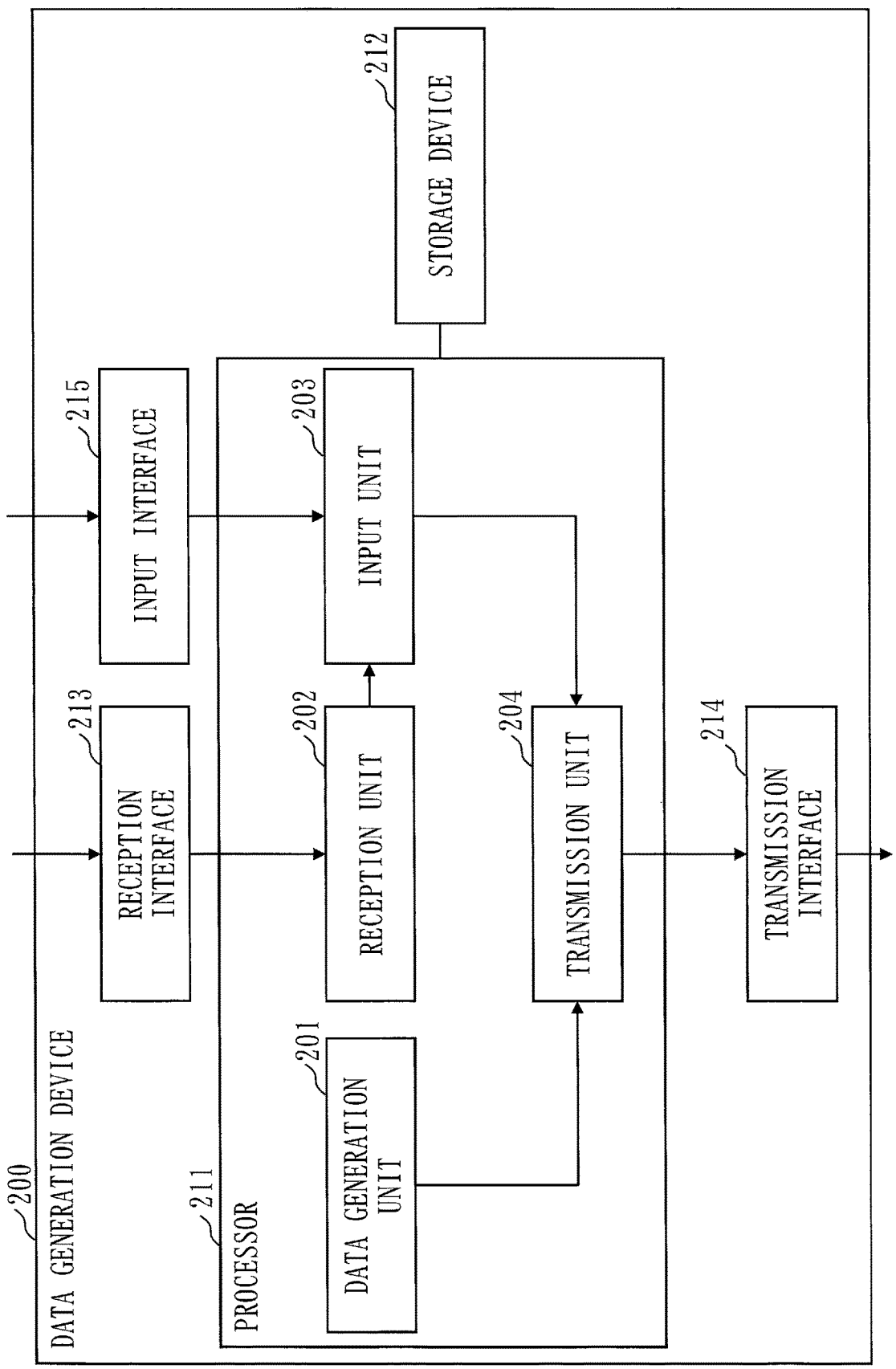
FIG. 3 is a diagram illustrating a configuration example of a data generation device according to the first embodiment.

FIG. 3 illustrates a configuration example of the data generation device 200.

The data generation device 200 is a computer.

The data generation device 200 includes, as hardware, a processor 211, a storage device 212, a reception interface 213, a transmission interface 214, and an input interface 215.

The data generation device 200 includes, as a functional configuration, a data generation unit 201, a reception unit 202, an input unit 203, and a transmission unit 204.

The storage device 212 stores therein programs for realizing functions of the data generation unit 201, the reception unit 202, the input unit 203, and the transmission unit 204.

The processor 211 executes these programs to perform operations of the data generation unit 201, the reception unit 202, the input unit 203, and the transmission unit 204 described later.

In FIG. 3, a state where the processor 211 is executing the programs for realizing functions of the data generation unit 201, the reception unit 202, the input unit 203, and the transmission unit 204 is schematically illustrated.

The reception interface 213 receives various types of data. The transmission interface 214 transmits various types of data.

The input interface 215 acquires various instructions from an operator.

The data generation unit 201 generates the device data (D) and the basic information (B) of the device. As described above, the device data (D) includes, for example, the power usage data and the time data at which the data is generated. In the present embodiment, the power usage data is illustrated as "P", the time data at which the data is generated is illustrated as "TIME", and the device data "D" is illustrated as "D=(P, TIME)".

Further, the power usage data (P) in the device data (D) is an aggregate value $P=Q_1+\ldots Q_N$ of power consumption $(Q_1, \ldots, Q_N)$ of each of N home electric appliances $(M_1, \ldots, M_N)$, and if it is assumed that the maximum power consumption that can be caused by each of home electric appliances $(M_1, \ldots, M_N)$ is $(E_1, \ldots, E_N)$, the basic information (B) indicates $\{(M_1, E_1) \ldots, (M_N, E_N)\}$. The basic information (B) can also include various kinds of information of devices such as average power consumption and installation places of respective home electric appliances.

The reception unit 202 receives a seed disclosure request from the data analysis device 500.

When the reception unit 202 receives the seed disclosure request, the input unit 203 acquires a disclosure approval or a disclosure disapproval of seeds (S) from an operator of the data generation device 200.

The input unit 203 also acquires a seed change request from the operator.

Further, the input unit 203 acquires from the operator the protection target device list (L) with respect to the device data (D) generated by the data generation unit 201. For example, $(M'_1, \ldots, M'_H)$ is illustrated as the protection target device list (L). "$M'_1, \ldots, M'_H$" corresponds to any of the N home electric appliances $(M_1, \ldots, M_N)$ included in the basic information (B). Note that H is an integer equal to or more than 1 and equal to or less than N.

The transmission unit 204 transmits the device data (D), the basic information (B) of the device, and the protection target device list (L) to the data accumulation device 300.

When the operator inputs a disclosure approval in response to the seed disclosure request, the transmission unit 204 transmits a pair of the seed disclosure request and the approval notification to the data scrambling device 400. When the operator inputs a disclosure disapproval in response to the seed disclosure request, the transmission unit 204 transmits a disapproval notification to the data analysis device 500. The security can be improved by adding an electronic signature to the approval notification or the disapproval notification so that the approval notification or the disapproval notification is not falsified.

The transmission unit 204 transmits a seed change request to the data scrambling device 400.

Figure 4:
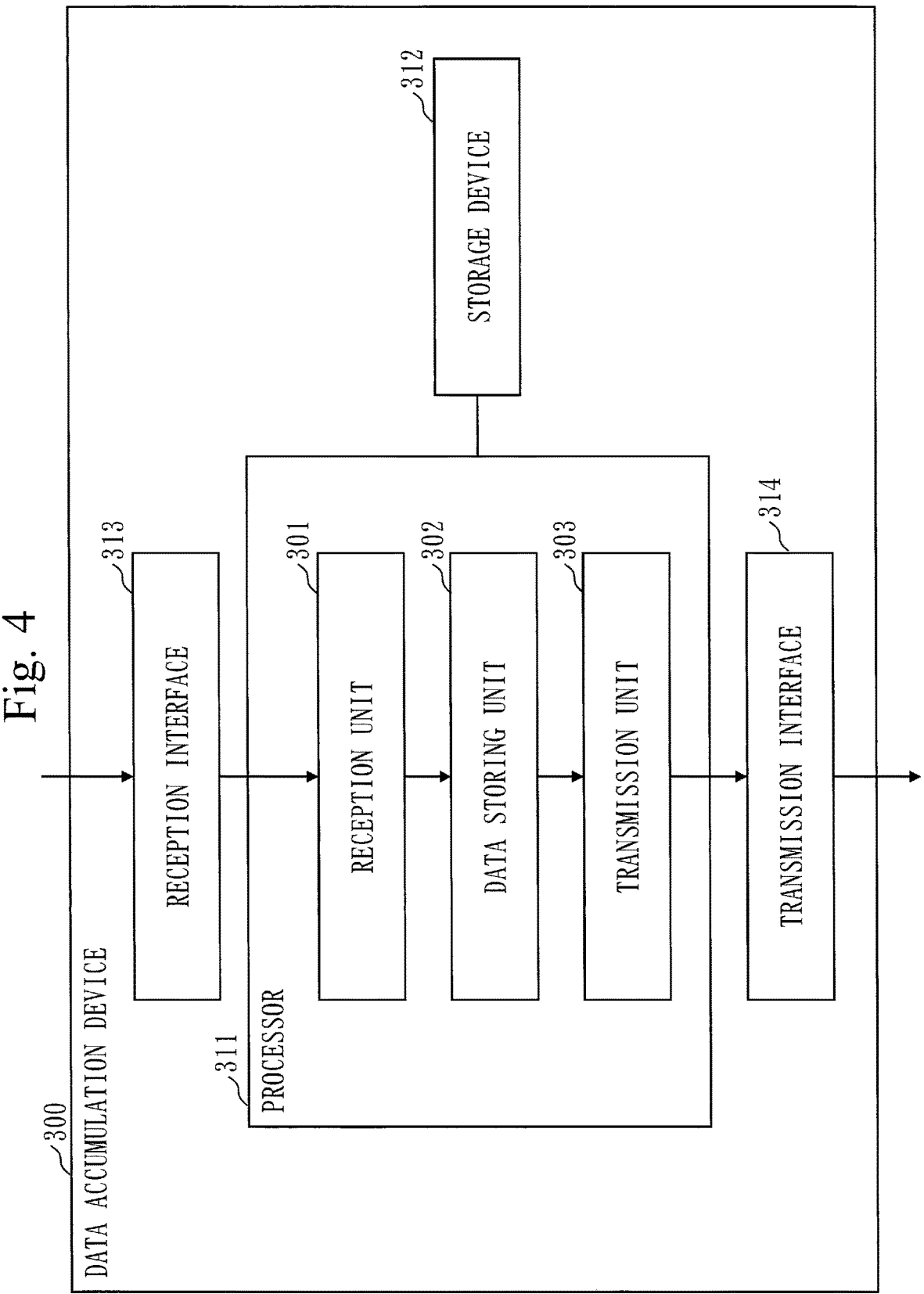
FIG. 4 is a diagram illustrating a configuration example of a data accumulation device according to the first embodiment.

FIG. 4 illustrates a configuration example of the data accumulation device 300.

The data accumulation device 300 is a computer.

The data accumulation device 300 includes, as hardware, a processor 311, a storage device 312, a reception interface 313, and a transmission interface 314.

The data accumulation device 300 includes, as a functional configuration, a reception unit 301, a data storing unit 302, and a transmission unit 303.

The storage device 312 stores therein programs for realizing functions of the reception unit 301, the data storing unit 302, and the transmission unit 303.

The processor 311 executes these programs to perform operations of the reception unit 301, the data storing unit 302, and the transmission unit 303 described later.

In FIG. 4, a state where the processor 311 is executing the programs for realizing the functions of the reception unit 301, the data storing unit 302, and the transmission unit 303 is schematically illustrated.

The reception interface 313 receives various types of data. The transmission interface 314 transmits various types of data.

The reception unit 301 receives the device data (D), the basic information (B), and the protection target device list (L) transmitted from the data generation device 200.

The reception unit 301 receives a storage-data disclosure request transmitted from the data analysis device 500.

The data storing unit 302 stores the device data (D), the basic information (B), and the protection target device list (L) received by the reception unit 301 together in the storage device 312. For example, FIG. 15 illustrates a data set (D, B, K) stored in the storage device 312, and every time a data storage process is performed, data described in each line is stored in the storage device 312.

Further, when a storage-data disclosure request is received by the reception unit 301, the data storing unit 302 reads out the device data (D), the basic information (B), and the protection target device list (L) from the storage device 312. When designation of date and time is included in the storage-data disclosure request, the data storing unit 302 checks the time data (TIME) included in the device data (D) with regard to all the sets of (D, B, L) stored in the storage device 312, and when the time data matches with the designated date and time, the data storing unit 302 reads out the set of the device data (D), the basic information (B), and the protection target device list (L). A plurality of sets read out here are illustrated as $((D_1, B_1, L_1), \ldots, (D_T, B_T, L_T))$. T is an integer equal to or more than 1. If there is no data set (D, B, L) matched with the date and time designated by the storage-data disclosure request in the storage device 312, the data storing unit 302 sets a value meaning an empty set in a readout result. For example, the data storing unit 302 sets 0.

The transmission unit 303 transmits the device data (D), the basic information (B), and the protection target device list (L) read out by the data storing unit 302 to the data scrambling device 400.

Figure 5:
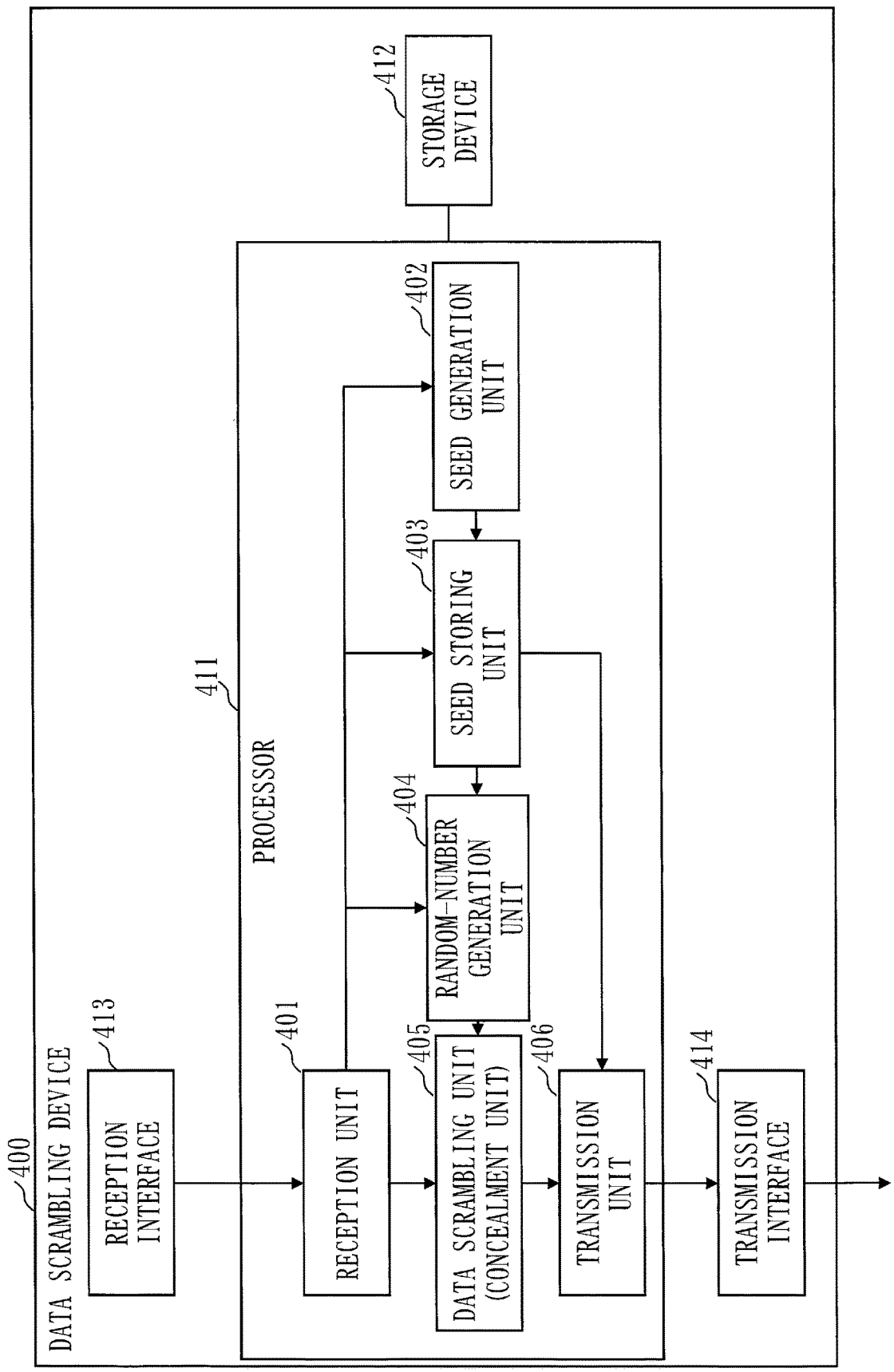
FIG. 5 is a diagram illustrating a configuration example of a data scrambling device according to the first embodiment.

FIG. 5 illustrates a configuration example of the data scrambling device 400.

The data scrambling device 400 includes, as hardware, a processor 411, a storage device 412, a reception interface 413, and a transmission interface 414.

The data scrambling device 400 includes, as a functional configuration, a reception unit 401, a seed generation unit 402, a seed storing unit 403, a random-number generation unit 404, a data scrambling unit 405, and a transmission unit 406.

The storage device 412 stores therein programs for realizing functions of the reception unit 401, the seed generation unit 402, the seed storing unit 403, the random-number generation unit 404, the data scrambling unit 405, and the transmission unit 406.

The processor 411 executes these programs to perform operations of the reception unit 401, the seed generation unit 402, the seed storing unit 403, the random-number generation unit 404, the data scrambling unit 405, and the transmission unit 406 described later.

In FIG. 5, a state where the processor 411 is executing the programs for realizing the functions of the reception unit 401, the seed generation unit 402, the seed storing unit 403, the random-number generation unit 404, the data scrambling unit 405, and the transmission unit 406 is schematically illustrated.

The reception interface 413 receives various types of data. The transmission interface 414 transmits various types of data.

The reception unit 401 receives T sets (D, B, L) of the device data (D), the basic information (B), and the protection target device list (L) transmitted from the data accumulation device 300. T is an integer equal to or more than 1.

The reception unit 401 also receives a seed disclosure request and an approval notification from the data generation device 200.

Further, the reception unit 401 receives a seed change request from the data generation device 200.

The seed generation unit 402 generates a seed (S) for a random number for scrambling the device data (D). The seed generation unit 402 generates a plurality of seeds $(S_1, \ldots, S_K)$ (where K is an integer equal to or more than 2) at a time. The plurality of seeds $(S_1, \ldots, S_K)$ are collectively referred to as "seeds (S)".

The seed storing unit 403 stores the seeds $(S=(S_1, \ldots, S_K))$ generated by the seed generation unit 402 in the storage device 412. The seed storing unit 403 also stores storage times of the seeds (S) in the storage device 412.

The seed storing unit 403 reads out partial seeds $(S'=(S'_1, \ldots, S'_J))$ of the seeds $(S=(S_1, \ldots, S_K))$ (where J is an integer equal to or more than 1 and equal to or less than K, and $S'_1, \ldots, S'_j$ are any values of $S_1, \ldots, S_K$) from the storage device 412 based on the seed disclosure request received by the reception unit 401.

The random-number generation unit 404 generates random numbers $(R=(R_1, \ldots, R_K))$ by using the basic information (B), the protection target device list (L) received by the reception unit 401, and the seeds $(S=(S_1, \ldots, S_K))$ read out by the seed storing unit 403.

An operation performed by the random-number generation unit 404 corresponds to a random-number generation process.

The random-number generation unit 404 generates random numbers, for example, according to the following method.

First, the random-number generation unit 404 uses the basic information $(B=\{(M_1, E_1), \ldots, (M_N, E_N)\})$ and the protection target device list $(L=(M'_1, \ldots, M'_H))$ with respect to (D, B, L) received by the reception unit 401 to extract pieces of information $\{(M'_1, E'_1), \ldots, (M'_H, E'_H)\}$ relating to the protection target device list (L) from the basic information (B), and specifies the maximum power consumption (E) that is the largest and can be caused and corresponding home electric appliance (M). The specified power consumption (E) represents the largest value in the maximum power consumption that can be caused among the home electric appliances included in the protection target device list (L).

Next, the random-number generation unit 404 generates random numbers by applying a prescribed random-number generation algorithm.

The random-number generation unit 404 generates random numbers, for example, according to a Laplace distribution LAP with an expected value=0, a dispersion=$2R^2$ having a probability density function described below.

$$LAP(x|R)=(1/(2R))\times(EXP(-|x|/R))$$

where EXP(y) means a natural logarithm e raised to the power of y.

At this time, the random-number generation unit 404 generates a random number $R_1$ according to LAP(x|E/ε) by using one element $S_I$ of the seeds (S) with respect to a parameter ε representing a privacy level decided by the operator or predetermined by the system and the largest power consumption (E) in the maximum power consumption that can be caused among the home electric appliances included in the protection target device list (L). Note that I is an integer equal to or more than 1 and equal to or less than K. In this manner, the random-number generation unit 404 generates random numbers (R=($R_1$, ..., $R_K$) with respect to the respective sets (D, B, L) by using the seeds (S= ($S_1$, ..., $S_K$)). That is, the random-number generation unit 404 generates a plurality of random numbers with respect to one piece of power usage data to be concealed.

The parameter ε representing a privacy level is a real value. As the parameter ε approaches 0, the privacy level increases. Further, as the parameter ε approaches 0, a large random number is generated. The operator needs to adjust the parameter ε so that the data analysis device 500 can analyze the analysis data (A). For example, an optimum value of the parameter ε can be calculated by learning the parameter ε beforehand according to the analysis contents.

The random-number generation unit 404 may generate random numbers not according to the Laplace distribution described above, but according to a well-known normal distribution $N(\mu, \sigma^2)$ with an expected value=μ and a dispersion=$\sigma^2$.

When random numbers are to be generated according to the normal distribution $N(\mu, \sigma^2)$, the random-number generation unit 404 first calculates the following σ with respect to a parameter (ε, δ) representing a privacy level decided by the operator or predetermined by the system and the largest power consumption (E) in the maximum power consumption that can be caused by the home electric appliances included in the protection target device list (L).

$$\sigma=(E/\varepsilon)\times(2\times LOG(1.25/\delta))^{1/2}$$

where LOG(y) means a logarithm of y to the base natural logarithm e.

Thereafter, the random-number generation unit 404 uses one element $S_1$ of the seeds (S) to generate the random number $R_1$ according to $N(0, \sigma^2)$. Note that I is an integer equal to or more than 1 and equal to or less than K. In this manner, the random-number generation unit 404 generates random numbers (R=($R_1$, ..., $R_K$)) by using the seeds (S=($S_1$, $S_K$)). That is, the random-number generation unit 404 generates a plurality of random numbers with respect to one piece of power usage data to be concealed.

As in the case of the Laplace distribution, each of the parameter ε and the parameter δ representing the privacy level is a real number. As the parameter ε and the parameter δ approach 0, the privacy level increases. Further, as the parameter ε and the parameter δ approach 0, a large random number is generated. The operator needs to adjust the parameter ε and the parameter δ so that the data analysis device 500 can analyze the analysis data (A). For example, an optimum values of the parameter ε and the parameter δ can be calculated by learning the parameter ε and the parameter δ beforehand according to the analysis contents.

In the above example, the generation methods of random numbers using the Laplace distribution and the normal distribution have been described. However, a method of generating random numbers depending on the parameter (ε, δ) representing a privacy level can be used by using exponential distribution used also in a differential privacy technique and other various types of distribution. Further, for generation of random numbers to be used in the present embodiment, a random-number generation technique that can restore the generated random number (R) if the seed (S) is known is used. For example, when random numbers (R=($R_1$, ..., $R_K$)) are to be generated with respect to certain device data (D=(P, TIME)) by using the seeds (S=($S_1$, ..., $S_K$)), random numbers (R) according to the Laplace distribution or the normal distribution are assumed to be generated uniquely (that is, deterministically) based on the seeds (S) and the time data (TIME). More specifically, such a random-number generation technique is used that can generate random numbers (R) as $R_1=F(S_1, TIME)$, ..., $R_K=F(S_K, TIME)$ by using a function F that deterministically outputs a random number with respect to an input.

The data scrambling unit 405 generates analysis data (A) by adding random numbers (R=($R_1$, $R_K$)) generated by the random-number generation unit 404 to the device data (D) received by the reception unit 401. That is, the data scrambling unit 405 performs concealment by using a plurality of random numbers in order to hide the power consumption and operation history of the protection target devices indicated in the protection target device list (L) in the power usage data (P) of the device data (D).

Specifically, the data scrambling unit 405 conceals the power usage data of the protection target device by adding a plurality of random numbers to the power usage data (P) with respect to the device data (D=(P, TIME)). For example, when a value of the power usage data of the protection target device is 100 and the generated random numbers are 11, 32, and 65 (K=3), the data scrambling unit 405 acquires 100+11+32+65=208.

In this manner, the data scrambling unit 405 generates power usage data after concealment (C) by concealing the power usage data (P), as C=P+$R_1$+ ... +$R_K$, and generates the analysis data (A=(C, TIME)).

The power usage data after concealment (C) in the analysis data (A) corresponds to concealed data.

The data scrambling unit 405 corresponds to a concealment unit. An operation performed by the data scrambling unit 405 corresponds to a concealment process.

The transmission unit 406 transmits the analysis data (A) generated by the data scrambling unit 405 to the data analysis device 500.

Further, when the reception unit 401 receives a seed disclosure request and an approval notification after the analysis data (A) is transmitted to the data analysis device 500, the transmission unit 406 transmits partial seeds (S'=($S'_1$, ..., $S'_J$)) acquired from the seed storing unit 403 to the data analysis device 500.

An operation performed by the transmission unit 406 corresponds to a transmission process.

Figure 6:
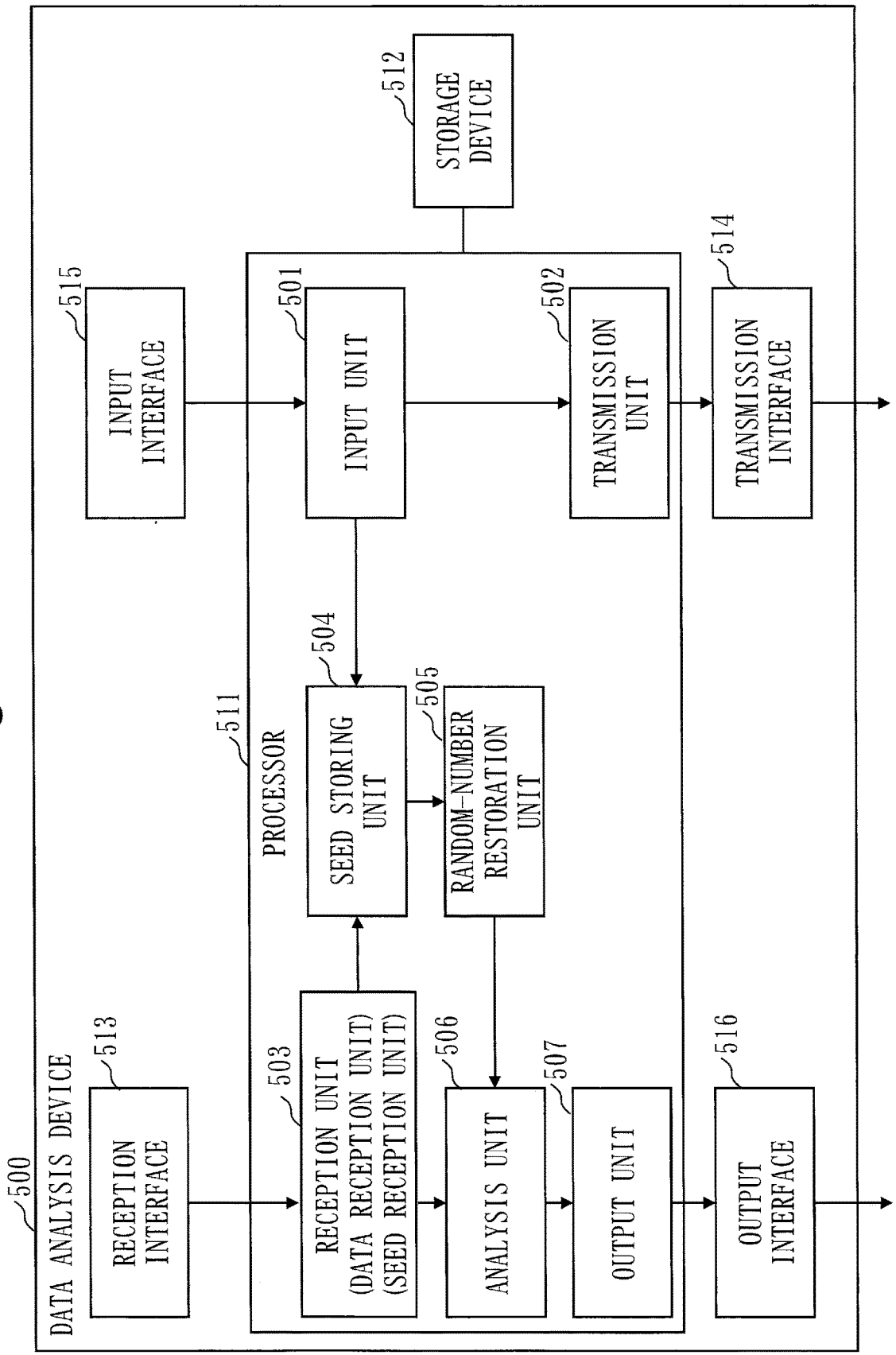
FIG. 6 is a diagram illustrating a configuration example of a data analysis device according to the first embodiment.

FIG. 6 illustrates a configuration example of the data analysis device 500.

The data analysis device 500 is a computer.

The data analysis device 500 includes, as hardware, a processor 511, a storage device 512, a reception interface 513, a transmission interface 514, an input interface 515, and an output interface 516.

The data analysis device 500 includes, as a functional configuration, an input unit 501, a transmission unit 502, a reception unit 503, a seed storing unit 504, a random-number restoration unit 505, an analysis unit 506, and an output unit 507.

The storage device 512 stores therein programs for realizing functions of the input unit 501, the transmission unit 502, the reception unit 503, the seed storing unit 504, the random-number restoration unit 505, the analysis unit 506, and the output unit 507.

The processor 511 executes these programs to perform operations of the input unit 501, the transmission unit 502, the reception unit 503, the seed storing unit 504, the random-number restoration unit 505, the analysis unit 506, and the output unit 507 described later.

In FIG. 6, a state where the processor 511 is executing the programs for realizing the functions of the input unit 501, the transmission unit 502, the reception unit 503, the seed storing unit 504, the random-number restoration unit 505, the analysis unit 506, and the output unit 507 is schematically illustrated.

The reception interface 513 receives various types of data.

The transmission interface 514 transmits various types of data.

The input interface 515 acquires various instructions from a data analyst.

The output interface 516 outputs various types of information.

The input unit 501 acquires a storage-data disclosure request from the data analyst.

Further, the input unit 501 acquires a seed disclosure request from the data analyst.

The transmission unit 502 transmits the storage-data disclosure request to the data accumulation device 300. For example, a period of the device data (D) to be acquired is indicated in the storage-data disclosure request.

The transmission unit 502 also transmits the seed disclosure request to the data generation device 200. For example, a period of the analysis data (A) whose analysis accuracy is to be increased is indicated in the seed disclosure request. The data scrambling device 400 discloses partial seeds (S') of the seeds (S) used for generating random numbers generated in the period indicated in the seed disclosure request in response to the seed disclosure request.

The reception unit 503 receives pieces of analysis data $(A_1, \ldots, A_T)$ transmitted from the data scrambling device 400. T is an integer equal to or larger than 1.

The reception unit 503 also receives a disapproval notification from the data generation device 200. Further, the reception unit 503 receives the partial seeds (S') from the data scrambling device 400.

The reception unit 503 corresponds to a data reception unit and a seed reception unit. An operation performed by the reception unit 503 corresponds to a data reception process and a seed reception process.

The seed storing unit 504 stores the storage-data disclosure request acquired by the input unit 501 together with the partial seeds (S') received by the reception unit 503 in the storage device 512.

Further, the seed storing unit 504 reads out the partial seeds (S') from the storage device 512 based on a value of the storage time included in the analysis data $(A_1, \ldots, A_T)$ received by the reception unit 503. If there is no corresponding seed, the seed storing unit 504 returns a value indicating empty data to the random-number restoration unit 505.

The random-number restoration unit 505 uses the partial seeds $(S'=(S'_1, \ldots, S'_J))$ read out by the seed storing unit 504 to restore a part of random numbers $(R'=(R'_1, \ldots, R'_J))$ used for generating concealed data (C) of the analysis data (A=(C, TIME)).

That is, the random-number restoration unit 505 applies the random-number generation algorithm applied when the random-number generation unit 404 of the data scrambling device 400 generates random numbers from the seed (S) to the partial seeds (S') to restore a part of random numbers (R') used for generating the concealed data (C) included in the analysis data (A).

For example, in order to restore a part of random numbers $(R'=(R'_1, \ldots, R'_J))$ from the concealed data $(C=D+R_1+ \ldots +R_K)$ included in certain analysis data (A=(C, TIME)), the random-number restoration unit 505 can easily restore a part of random numbers (R') as $R'_1=F(S'_1, TIME), \ldots, R'_J=F(S'_J, TIME)$ with respect to the partial seeds $(S'=(S'_1, \ldots, S'_J))$ and the time data (TIME), by using the function F of the random-number restoration method described above.

An operation performed by the random-number restoration unit 505 corresponds to a random-number restoration process.

The analysis unit 506 performs analysis by using the analysis data $(A_1, \ldots, A_T)$ received by the reception unit 503. For example, the analysis unit 506 extracts the power consumption and operation history of respective home electric appliances by using the concealed power usage data (P), included in the analysis data $(A_1, \ldots, A_T)$ to analyze the use tendency.

Further, when a part of random numbers $(R'=(R'_1, \ldots, R'_J))$ used for generating the concealed data $(C_i)$ in the analysis data $(A_i=(C_i, TIME))$ is acquired from the random-number restoration unit 505, the analysis unit 506 removes a part of random numbers $(R'_i)$ from the concealed data $(C_i)$ by using $R'_i=(R'_{i1}, \ldots, R'_{ij})$. Specifically, the analysis unit 506 generates accuracy-improved analysis data $(A'_i=(C'_i, TIME))$ by using $C'_i=C_i-R'_{i1}- \ldots -R'_{ij}$, and performs analysis by using the accuracy-improved analysis data (A').

An operation performed by the analysis unit 506 corresponds to an analysis process.

For example, when a value of the power usage data (P) included in the device data (D) is 100 and random numbers used for scrambling by the data scrambling device 400 are 11, 32, and 65 (K=3), a value of the concealed data (C) included in the analysis data (A) is 100+11+32+65=208. For example, when a partial seed $S'_3$ is transmitted from the data scrambling device 400 and 65 is acquired as a random number from the partial seed $S'_3$, the analysis unit 506 can acquire 208−65=143. As compared to 208 as the concealed value, 143 as a value after removal of the random number is closer to 100 as the original value. Therefore, the analysis unit 506 can acquire a value with high reliability for the power usage (P) before concealment, and can increase the analysis accuracy. Further, when a partial seed $S'_2$ is transmitted from the data scrambling device 400 and 32 is acquired as a random number from the partial seed $S'_2$, the analysis unit 506 can acquire 143−32=111. 111 as a value after removal of the random number is further closer to 100 as the original value, and the analysis unit 506 can further increase the analysis accuracy.

For example, when the data scrambling device 400 generates K random numbers by using K (K≥2) seeds and the power usage data is scrambled by using K random numbers, the transmission unit 502 can repeat transmission of a seed disclosure request until the total number of receptions of the partial seeds (S') becomes (K−1). Every time disclosure of seeds is approved by the data generation device 200, the transmission unit 406 of the data scrambling device 400 transmits an untransmitted partial seed (S') to the data analysis device 500, until the total number of transmissions of the partial seeds (S') becomes (K−1). Further, the reception unit 503 of the data analysis device 500 repeats reception of the partial seed (S') every time the partial seed (S') is transmitted from the data scrambling device 400.

In this manner, the analysis unit 506 removes a random number from the concealed data (C) stepwisely, and can bring the concealed value closer to the value before concealment stepwisely.

An example in which the data analysis device 500 requests disclosure of the partial seeds (S') stepwisely and the data scrambling device 400 discloses the partial seeds (S') stepwisely has been described. However, the data analysis device 500 can request disclosure of (K−1) partial seeds (S') at a time and the data scrambling device 400 can disclose the (K−1) partial seeds (S') at a time.

The analysis unit 506 can estimate a state of a person to be monitored in a manner described below by removing random numbers from the concealed data (C) to acquire a value close to the original value.

For example, a case is assumed where such a presumption standard is used that if power consumption of a certain home electric appliance is within a specified standard range in a certain period of time every day, it is estimated that there is no abnormality in the person to be monitored. For example, it is assumed that the standard range is a range from 80 to 130. The above value 208 of power usage before removal of random numbers is determined to be outside of the standard range. However, the value 111 of power usage after removal of the random numbers is determined to be within the standard range.

Further, the analysis unit 506 can perform more complicated analyses. For example, the analysis unit 506 can perform the analysis described in Patent Literature 4. Further, the analysis unit 506 can perform the analysis described in Patent Literature 5.

The output unit 507 outputs an analysis result of the analysis unit 506. For example, the output unit 507 outputs as the analysis result information such as a period of time during which a user performs activities and a period of time during which the user does not perform activities.

*Descriptions of Operations*

Next, an operation example of the privacy protection system 100 according to the present embodiment is described with reference to a flowchart.

Figure 7:
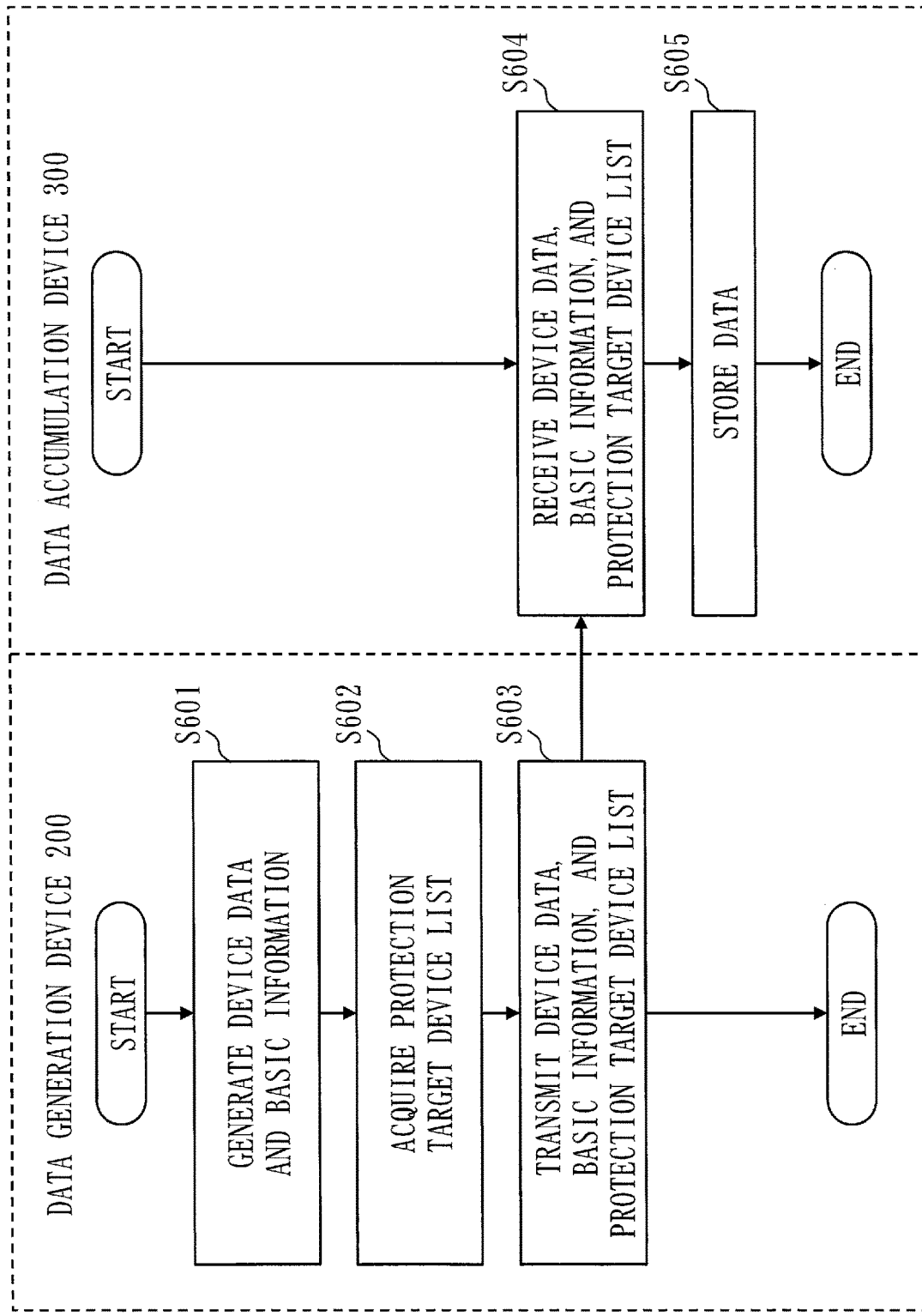
FIG. 7 is a flowchart illustrating a data storage process according to the first embodiment.

FIG. 7 is a flowchart illustrating a data storage process performed by the privacy protection system 100.

Steps S601 to S603 in FIG. 7 are performed by the data generation device 200. Steps S604 to S605 are performed by the data accumulation device 300.

In Step S601, the data generation unit 201 generates the device data (D) and the basic information (B).

In Step S602, the input unit 203 acquires the protection target device list (L) in which protection target devices are described.

In Step S603, the transmission unit 204 transmits the device data (D) and the basic information (B) generated in Step S601 and the protection target device list (L) input in Step S602 to the data accumulation device 300.

In Step S604, the reception unit 301 receives the device data (D), the basic information (B), and the protection target device list (L) transmitted in Step S603.

In Step S605, the data storing unit 302 stores the device data (D), the basic information (B), and the protection target device list (L) received in Step S604 in the storage device 312 in association with each other. Further, the data storing unit 302 stores a storage time of the device data (D), the basic information (B), and the protection target device list (L) in the storage device 312.

The data storage process is completed in the manner stated above.

Figure 8:
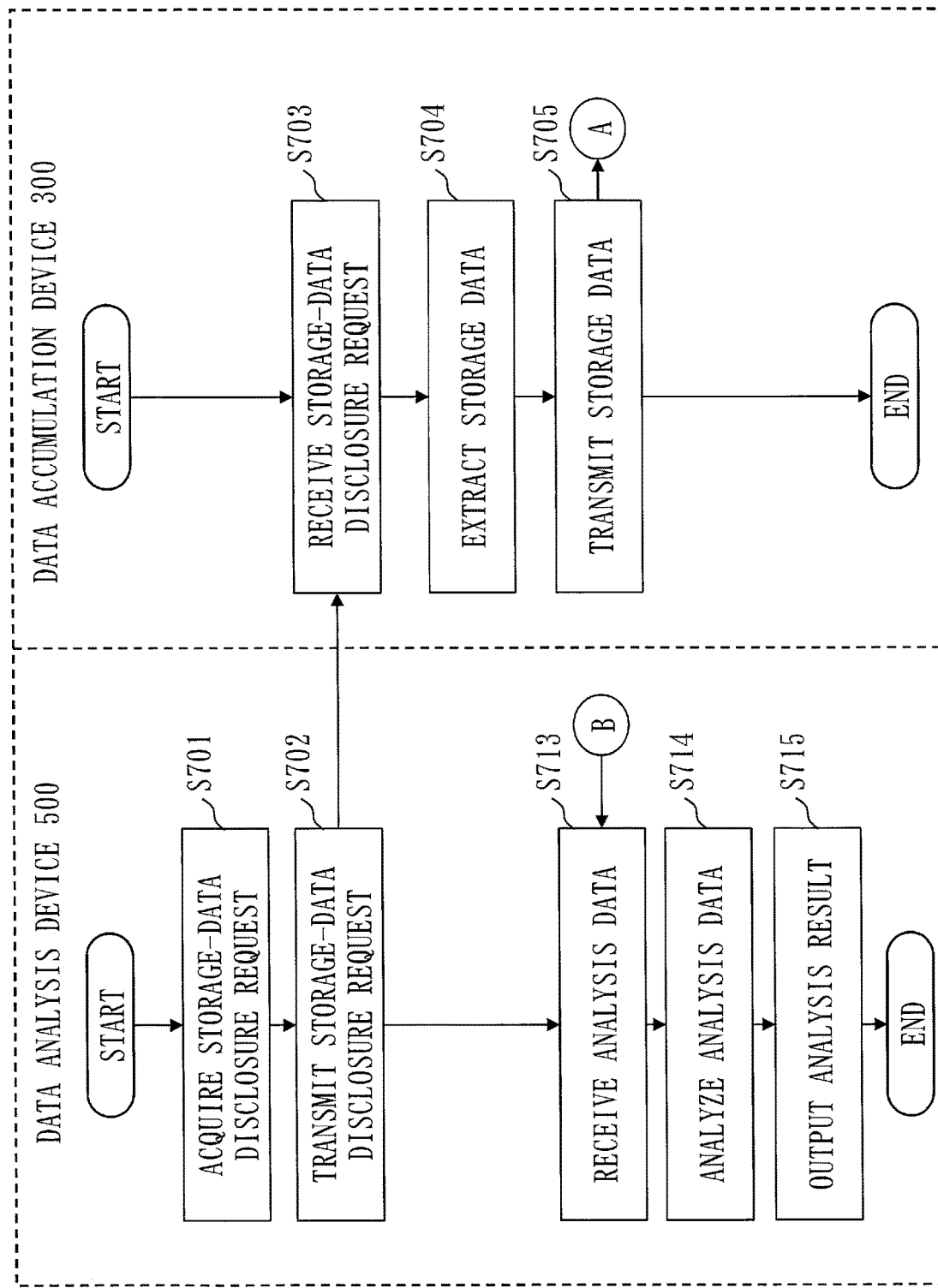
FIG. 8 is a flowchart illustrating a storage-data disclosure process according to the first embodiment.

FIG. 8 is a flowchart illustrating a storage-data disclosure process of the privacy protection system 100.

Figure 9:
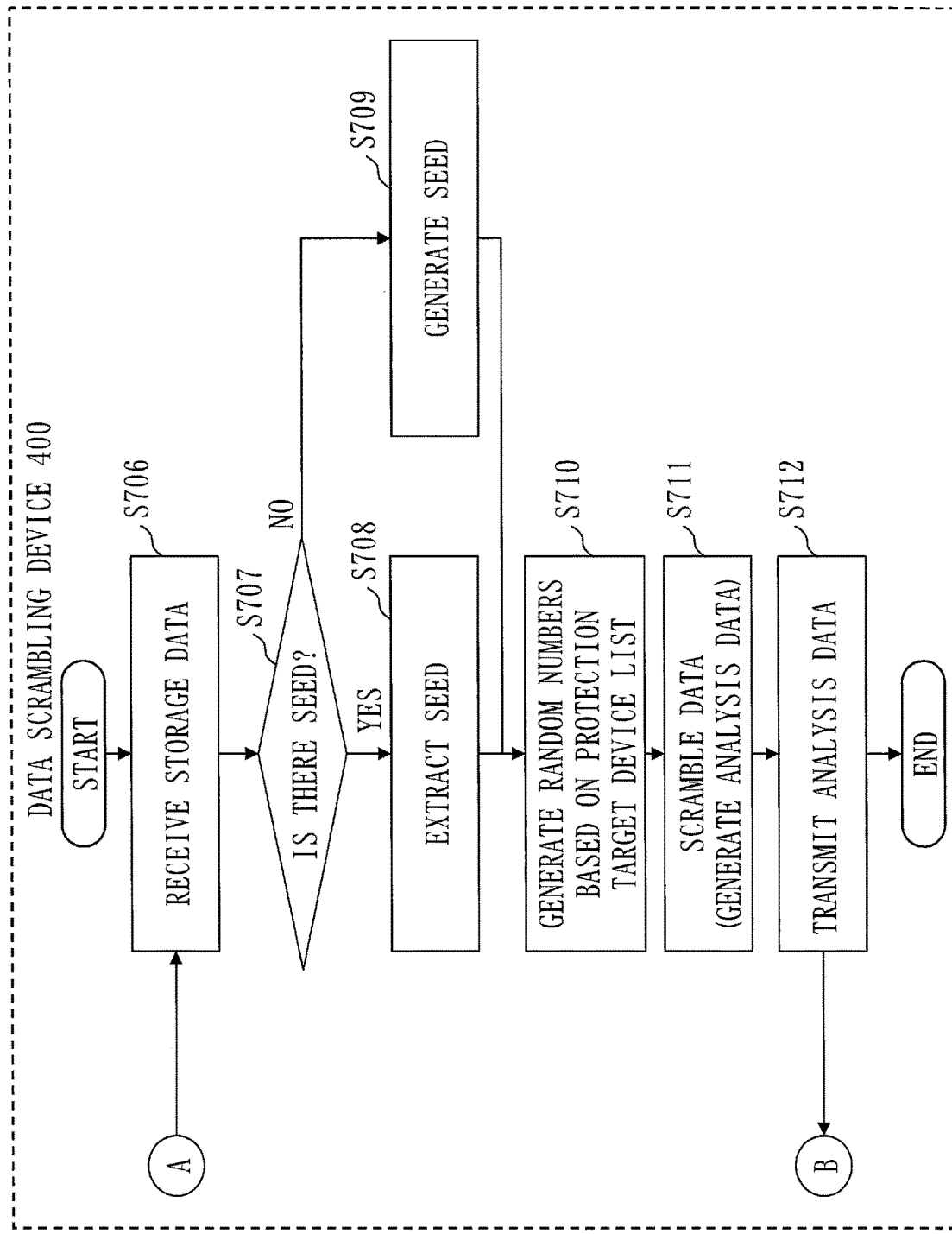
FIG. 9 is a flowchart illustrating a data scrambling process according to the first embodiment.

FIG. 9 is a flowchart illustrating a data scrambling process of the privacy protection system 100.

Step S701 to S702 and Step S713 to S715 are performed by the data analysis device 500. Step S703 to S705 are performed by the data accumulation device 300. Step S706 to S712 are performed by the data scrambling device 400.

In Step S701, the input unit 501 acquires a storage-data disclosure request. As described above, a period of the device data (D) to be acquired among the pieces of device data (D) stored in the data accumulation device 300, is indicated in the storage-data disclosure request.

In Step S702, the transmission unit 502 transmits the storage-data disclosure request acquired in Step S701 to the data accumulation device 300.

In Step S703, the reception unit 301 receives the storage-data disclosure request transmitted in Step S702.

In Step S704, the data storing unit 302 acquires the storage-data disclosure request received in Step S702 from the reception unit 301, and reads out storage data based on the storage-data disclosure request. The storage data is a set of the device data (D), the basic information (B) of the device, and the protection target device list (L). The data storing unit 302 can read out one set of storage data, or when a plurality of dates and times are designated in the storage-data disclosure request, the data storing unit 302 can read out a plurality of sets of storage data.

In Step S705, the transmission unit 303 transmits the storage data extracted in Step S704 to the data scrambling device 400.

In Step S706, the reception unit 401 receives the storage data transmitted in Step S705.

In Step S707, the seed storing unit 403 confirms whether the seeds (S) are stored in the storage device 412.

If the seeds (S) are stored in the storage device 412, in Step S708, the seed storing unit 403 reads out the stored seeds (S) from the storage device 412.

If the seeds (S) are not stored in the storage device 412, in Step S709, the seed generation unit 402 generates seeds $(S=(S_1, \ldots, S_K))$, and the seed storing unit 403 stores the generated seeds (S) in the storage device 412.

In Step S710, the random-number generation unit 404 acquires the basic information (B) and the protection target device list (L) in the storage data received in Step S706 from the reception unit 401. The random-number generation unit 404 acquires the seeds (S) read out in Step S708 or the seeds (S) generated in Step S709 from the seed storing unit 403. The random-number generation unit 404 generates random numbers $(R=(R_1, \ldots, R_K))$ based on the seeds (S), the basic information (B), and the protection target device list (L) as described above.

If the device data (D) received in Step S706 is provided in plural pieces (T), the random-number generation unit 404 generates T random numbers $R_1=(R_{11}, \ldots, R_{1K}), \ldots, R_T=(R_{T1}, \ldots, R_{TK})$.

In Step S711, the data scrambling unit 405 acquires the device data (D) in the storage data received in Step S706 from the reception unit 401. The data scrambling unit 405 also acquires random numbers $(R=(R_1, \ldots, R_K))$ generated in Step S710 from the random-number generation unit 404.

The data scrambling unit 405 scrambles the power usage data (P) included in the device data (D) by using the random numbers ($R=(R_1, \ldots, R_K)$) to generate the analysis data (A). As described above, the data scrambling unit 405 generates analysis data (A=(C, TIME)), as $C=P+R_1+ \ldots +R_K$. If the device data (D) received in Step S706 is provided in plural pieces (T), the data scrambling unit 405 generates T pieces of analysis data ($A_1=(C_1, TIME_1), \ldots, A_T(C_T, TIME_T)$) as $C_1=P_1+R_{11}+ \ldots +R_{1K}, \ldots, C_T=P_T+R_{T1}+ \ldots +R_{TK}$ with respect to the pieces of device data ($D_1=(P_1, TIME_1), \ldots, D_T=(P_T, TIME_T)$).

In Step S712, the transmission unit 406 acquires the analysis data (A) generated in Step S711 from the data scrambling unit 705 and transmits the analysis data (A) to the data analysis device 500.

In Step S713, the reception unit 503 receives the analysis data (A) transmitted in Step S712.

In Step S714, the analysis unit 506 acquires the analysis data (A) received in Step S713 from the reception unit 503 and analyzes the analysis data (A). Details of Step S714 are described later.

In Step S715, the output unit 507 acquires an analysis result generated in Step S714 from the analysis unit 506 and outputs the analysis result.

The data analysis process is completed in the manner stated above.

Figure 10:
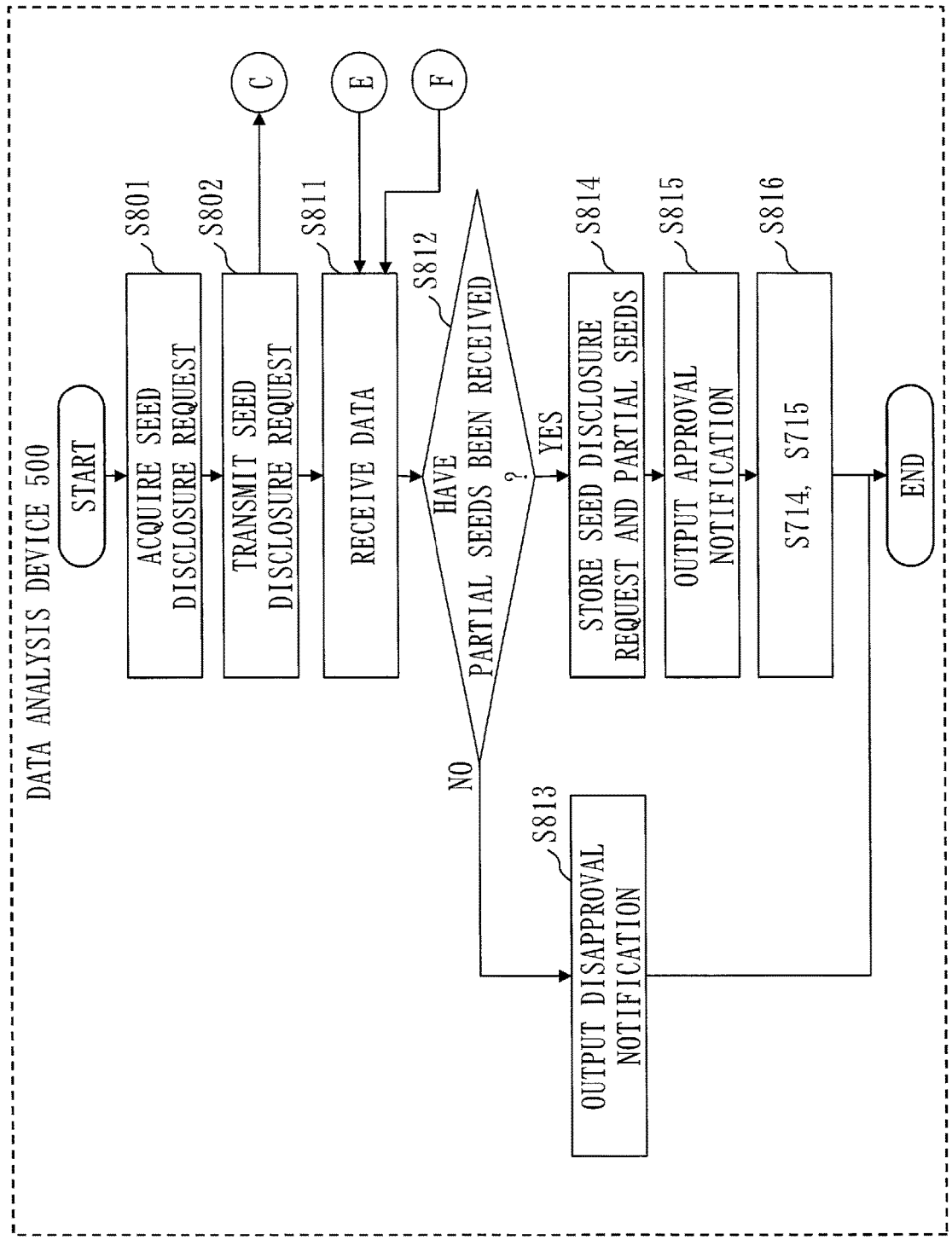
FIG. 10 is a flowchart illustrating an operation example of the data analysis device in a seed disclosure process according to the first embodiment.
Figure 11:
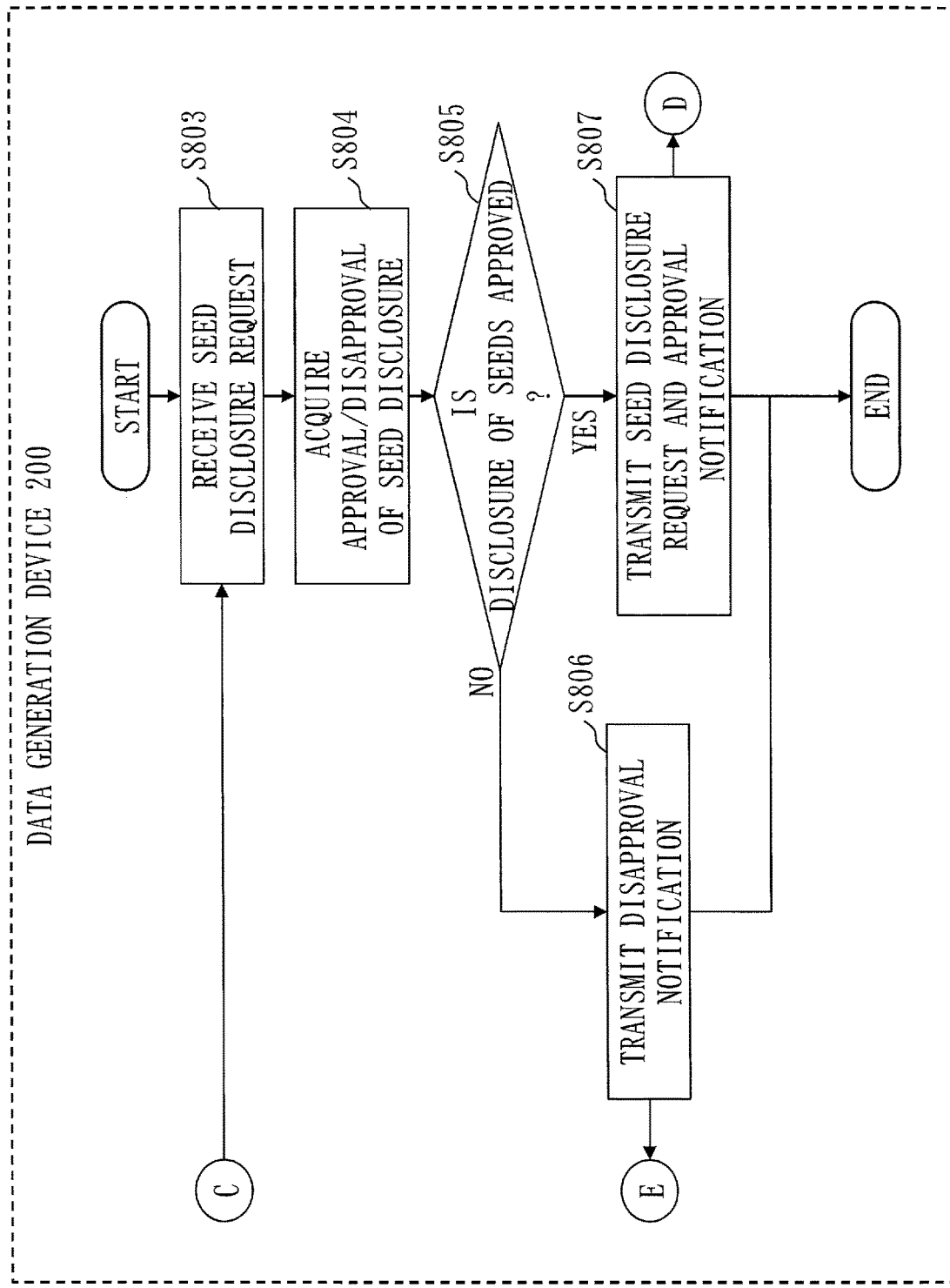
FIG. 11 is a flowchart illustrating an operation example of the data generation device in the seed disclosure process according to the first embodiment.
Figure 12:
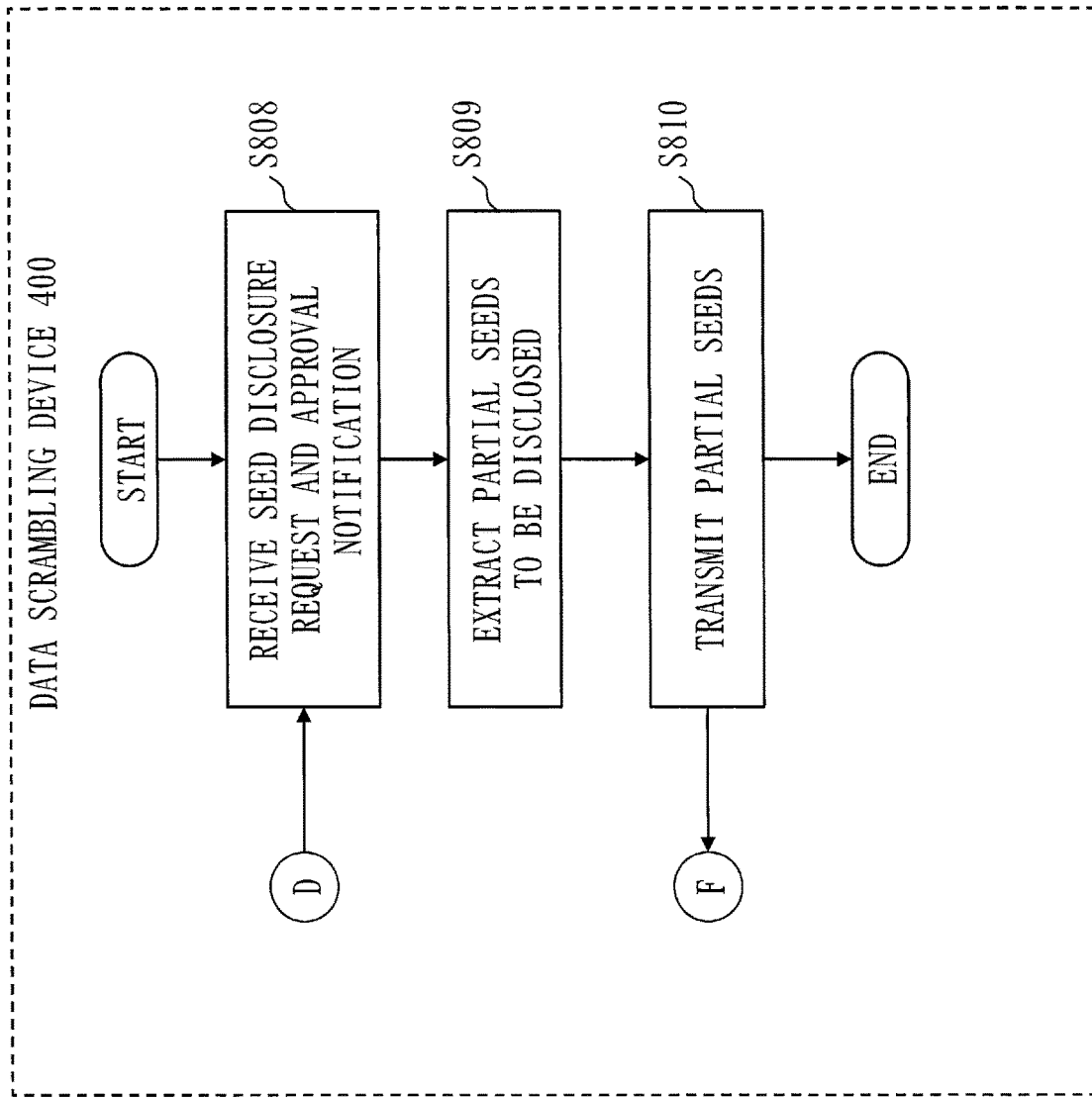
FIG. 12 is a flowchart illustrating an operation example of the data scrambling device in the seed disclosure process according to the first embodiment.

FIG. 10, FIG. 11, and FIG. 12 are flowcharts illustrating a seed disclosure process performed by the privacy protection system 100.

Steps S801 to S802 and Steps S811 to S816 are performed by the data analysis device 500. Steps S803 to S807 are performed by the data generation device 200. Steps S808 to S810 are performed by the data scrambling device 400.

In Step S801, the input unit 501 acquires a seed disclosure request from a data analyst.

In Step S802, the transmission unit 502 transmits the seed disclosure request acquired in Step S801 to the data generation device 200.

In Step S803, the reception unit 202 receives the seed disclosure request transmitted in Step S802.

In Step S804, the input unit 203 acquires from an operator a disclosure approval or a disclosure disapproval with respect to the seed disclosure request received in Step S803.

In Step S805, the transmission unit 204 determines whether an approval or a disapproval has been input from the operator in Step S804.

If a disapproval has been input from the operator, in Step S806, the transmission unit 204 transmits a disapproval notification to the data analysis device 500. In this case, Steps S807 to S810 thereafter are not performed.

On the other hand, if an approval has been input from the operator, in Step S807, the transmission unit 204 transmits the seed disclosure request and an approval notification to the data scrambling device 400. As described above, an electronic signature can be added to the approval notification so that the approval notification is not falsified, thereby improving the security.

In Step S808, the reception unit 401 receives the seed disclosure request and the approval notification transmitted in Step S807.

In Step S809, the seed storing unit 403 acquires the seed disclosure request and the approval notification received in Step S808 from the reception unit 401. The seed storing unit 403 reads out data related to the period included in the seed disclosure request and extracts partial seeds ($S'=(S'_1, \ldots, S'_J)$) being a part of the corresponding seeds (S).

In Step S810, the transmission unit 406 transmits the partial seeds ($S'=(S'_1, \ldots, S'_J)$) extracted in Step S809 to the data analysis device 500.

In Step S811, the reception unit 503 receives the disapproval notification transmitted in Step S806 from the data generation device 200 or the partial seeds (S') transmitted in Step S810 from the data scrambling device 400.

In Step S812, the reception unit 503 determines whether the data received in Step S811 is the partial seeds (S').

If the received data is not the partial seeds (S'), that is, when the disapproval notification has been received, in Step S813, the output unit 507 outputs the disapproval of the disclosure of the seeds.

On the other hand, if the received data is the partial seeds (S'), in Step S814, the seed storing unit 504 stores the seed disclosure request and the partial seeds (S') in the storage device 512 in association with each other.

In Step S815, the output unit 507 outputs the approval of the disclosure of the seeds.

In Step S816, the analysis unit 506 performs Step S714 in FIG. 8 and the output unit 507 performs Step S715 in FIG. 8. That is, the analysis unit 506 analyzes the accuracy improved analysis data (A') and the output unit 507 outputs an analysis result.

The seed disclosure process is completed in the manner stated above.

Figure 13:
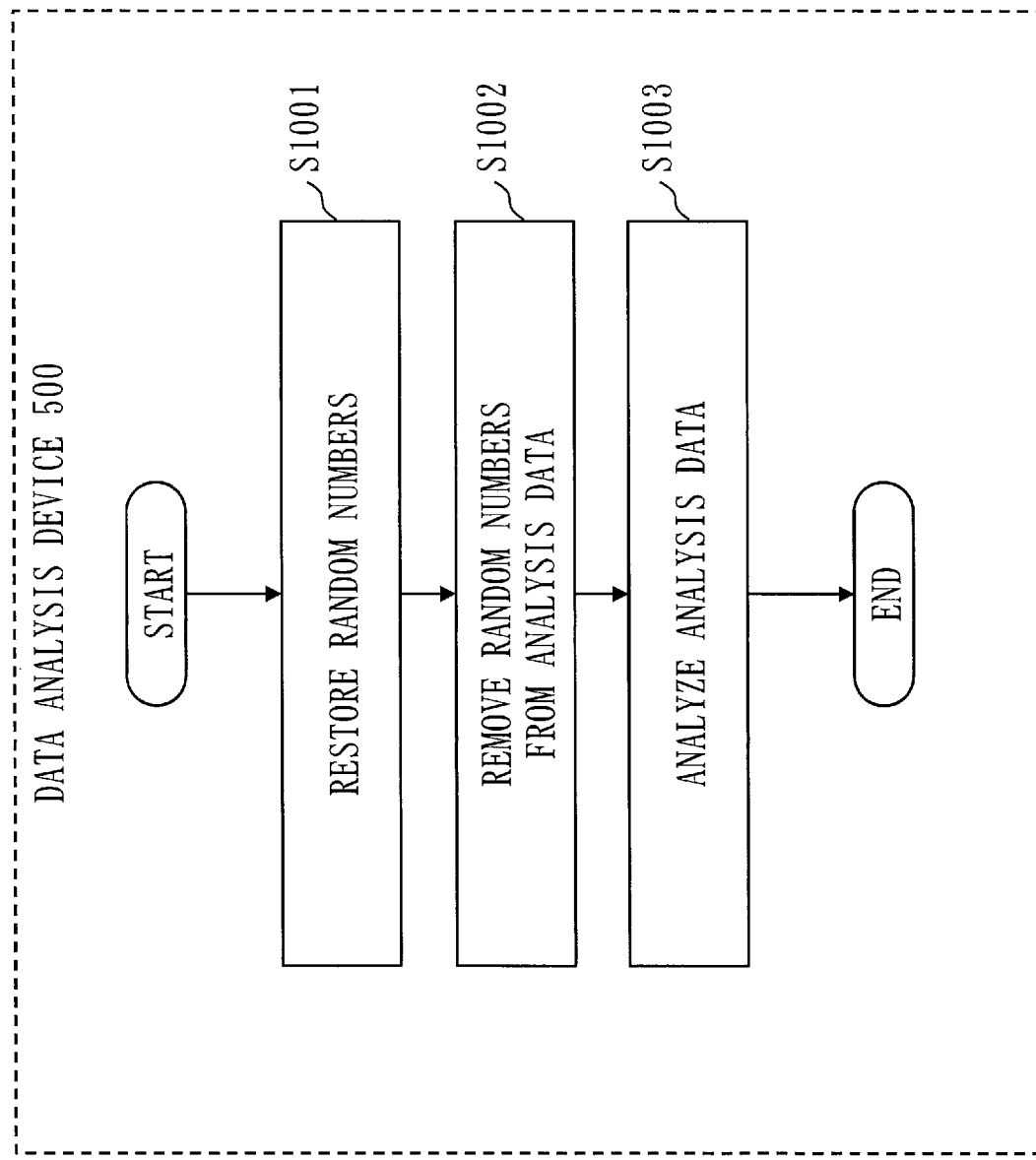
FIG. 13 is a flowchart illustrating an operation example of a data analysis process according to the first embodiment.

FIG. 13 is a flowchart illustrating a data analysis process illustrated in Step S714 in FIG. 8.

In Step S1001, the random-number restoration unit 505 restores partial random numbers (R') of the plurality of random numbers (R) used for scrambling in the data scrambling device 400 from the partial seeds (S').

More specifically, the random-number restoration unit 505 instructs the seed storing unit 504 to read out the partial seeds (S'). The seed storing unit 504 reads out the partial seeds (S') from the storage device 512 and transfers the read out partial seeds (S') to the random-number restoration unit 505. The random-number restoration unit 505 restores partial random numbers (R') by applying the random-number generation algorithm to be applied by the data scrambling device 400 to the read out partial seeds (S'). The random-number restoration unit 505 transfers the restored partial random numbers (R') to the analysis unit 506.

If the partial seeds (S') have not been stored in the storage device 512, the random-number restoration unit 505 notifies the analysis unit 506 that random numbers cannot be restored. In this case, Step S1002, which will be described later, is not performed.

In Step S1002, the analysis unit 506 removes the partial random numbers (R') from the concealed data (C) in the analysis data (A) to generate the accuracy-improved analysis data (A').

That is, the analysis unit 506 generates the accuracy-improved analysis data (A'=(C', TIME)) by using $C'=C-R'_1- \ldots -R'_J$.

In Step S1003, the analysis unit 506 analyzes the analysis data (A) or the accuracy-improved analysis data (A').

If the partial seeds (S') have not been received from the data scrambling device 400, the analysis unit 506 analyzes the analysis data (A). If the partial seeds (S') have been received from the data scrambling device 400 and the accuracy-improved analysis data (A') has been generated in Step S1002, the analysis unit 506 analyzes the accuracy-improved analysis data (A').

Figure 14:
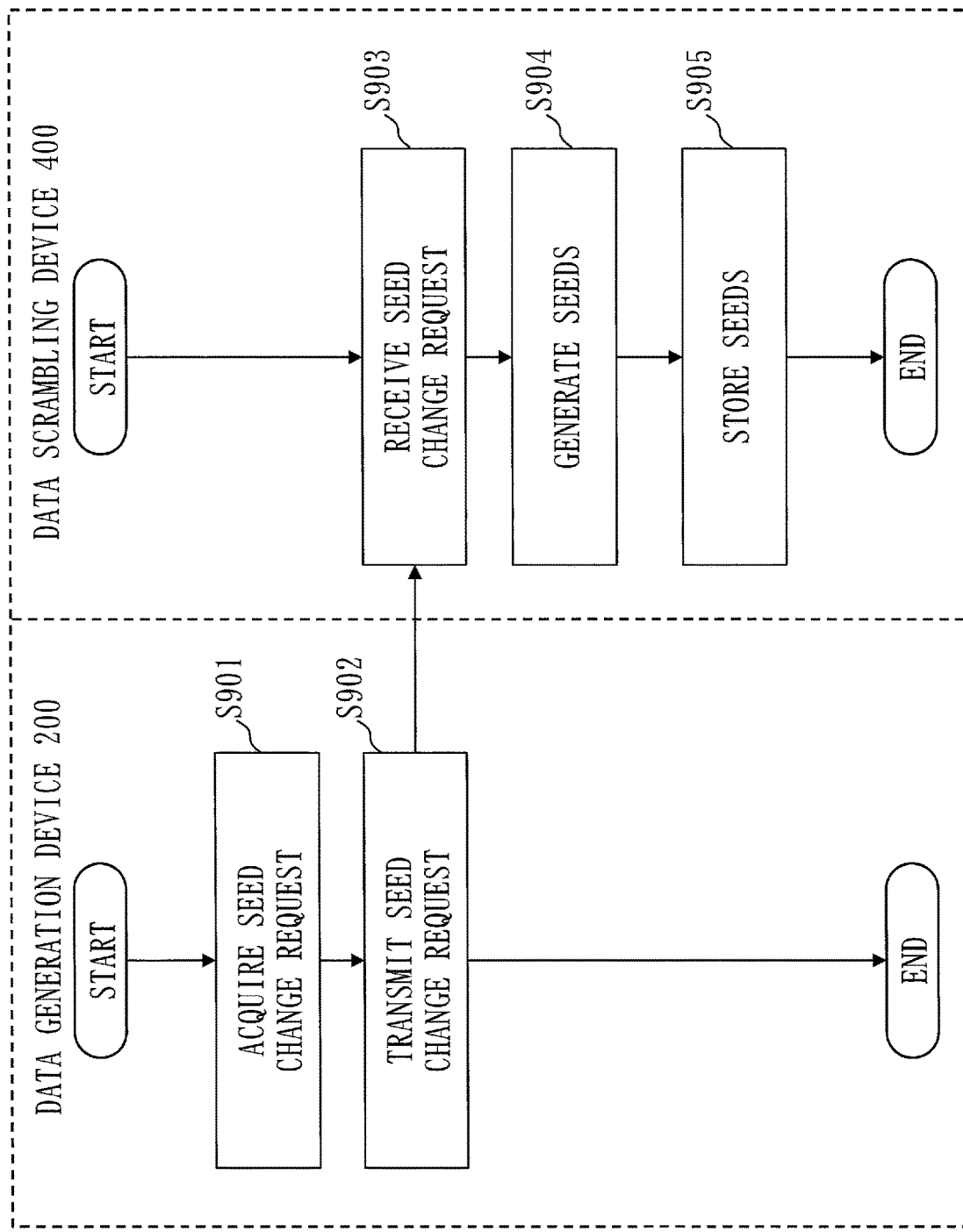
FIG. 14 is a flowchart illustrating a seed change process according to the first embodiment.

FIG. 14 is a flowchart illustrating a seed change process performed by the privacy protection system 100.

Steps S901 to S902 are performed by the data generation device 200. Steps S903 to S905 are performed by the data scrambling device 400.

In Step S901, the input unit 203 acquires a random-number seed change request from an operator.

In Step S902, the transmission unit 204 transmits the seed change request acquired in Step S901 to the data scrambling device 400.

In Step S903, the reception unit 401 receives the seed change request transmitted in Step S902.

In Step S904, the seed generation unit 402 generates random number seeds (S) based on the seed change request received in Step S903.

In Step S905, the seed storing unit 403 stores the seeds (S) generated in Step S904 in the storage device 512.

The seed change process is completed in the manner stated above.

*Descriptions of Effects of Embodiment*

According to the present embodiment, since data selected by a user as an object to be concealed is scrambled, user's privacy can be protected.

When it is necessary to increase the analysis accuracy in the analysis using the scrambled data, seeds used for generating random numbers that are used for scrambling are disclosed, and the random numbers can be removed from the scrambled data stepwisely. Therefore, according to the present embodiment, the accuracy of data analysis can be adjusted according to the disclosure degree of the seeds.

According to the present embodiment, the user can flexibly selects a home electric appliance to be concealed without concealing the power consumption and operation history of all the home electric appliances from the power usage data. Since the accuracy of data is not decreased more than necessary, both the concealment and analysis of data can be realized.

Further, according to the present embodiment, by updating the seeds, the safety of scrambled data can be improved.

*Descriptions of Hardware Configuration*

Finally, a hardware configuration of the data generation device 200, the data accumulation device 300, the data scrambling device 400, and the data analysis device 500 is explained supplementally.

Each of the processor 211, the processor 311, the processor 411, and the processor 511 is an IC (Integrated Circuit) that performs processing.

Each of the processor 211, the processor 311, the processor 411, and the processor 511 is a CPU (Central Processing Unit), a DSP (Digital Signal Processor), or the like.

Each of the storage device 212, the storage device 312, the storage device 412, and the storage device 512 is a RAM (Random Access Memory), a ROM (Read Only Memory), a flash memory, an HDD (Hard Disk Drive), or the like.

Each of the reception interface 213, the reception interface 313, the reception interface 413, the reception interface 513, the transmission interface 214, the transmission interface 314, the transmission interface 414, and the transmission interface 514 is, for example, a communication chip or a NIC (Network Interface Card).

Each of the input interface 215 and the input interface 515 is an interface with an input device such as a mouse and a keyboard.

The output interface 516 is an interface with an output device such as a display and a speaker.

Further, an OS (Operating System) is stored in the storage device 212, the storage device 312, the storage device 412, and the storage device 512.

The processor 211, the processor 311, the processor 411, and the processor 511 execute at least a part of the OS.

The processor 211, the processor 311, the processor 411, and the processor 511 execute the OS, thereby performing task management, memory management, file management, communication control and the like.

In the data generation device 200, information, data, signal values, and variable values indicating processing results of the data generation unit 201, the reception unit 202, the input unit 203, and the transmission unit 204 are stored in at least any one of the storage device 212, a register in the processor 211, and a cache memory.

Further, programs for realizing functions of the data generation unit 201, the reception unit 202, the input unit 203, and the transmission unit 204 can be stored in a portable storage medium such as a magnetic disk, a flexible disk, an optical disk, a compact disk, a Blu-ray (registered trademark) disk, and a DVD.

In the data accumulation device 300, information, data, signal values, and variable values indicating processing results of the reception unit 301, the data storing unit 302, and the transmission unit 303 are stored in at least any one of the storage device 312, a register in the processor 311, and a cache memory.

Further, programs for realizing functions of the reception unit 301, the data storing unit 302, and the transmission unit 303 can be stored in a portable storage medium such as a magnetic disk, a flexible disk, an optical disk, a compact disk, a Blu-ray (registered trademark) disk, and a DVD.

In the data scrambling device 400, information, data, signal values, and variable values indicating processing results of the reception unit 401, the seed generation unit 402, the seed storing unit 403, the random-number generation unit 404, the data scrambling unit 405, and the transmission unit 406 are stored in at least any one of the storage device 412, a register in the processor 411, and a cache memory.

Further, programs for realizing functions of the reception unit 401, the seed generation unit 402, the seed storing unit 403, the random-number generation unit 404, the data scrambling unit 405, and the transmission unit 406 can be stored in a portable storage medium such as a magnetic disk, a flexible disk, an optical disk, a compact disk, a Blu-ray (registered trademark) disk, and a DVD.

In the data analysis device 500, information data, signal values, and variable values indicating processing results of the input unit 501, the transmission unit 502, the reception unit 503, the seed storing unit 504, the random-number restoration unit 505, the analysis unit 506, and the output unit 507 are stored in at least any one of the storage device 512, a register in the processor 511, and a cache memory.

Further, programs for realizing functions of the input unit 501, the transmission unit 502, the reception unit 503, the seed storing unit 504, the random-number restoration unit 505, the analysis unit 506, and the output unit 507 can be stored in a portable storage medium such as a magnetic disk, a flexible disk, an optical disk, a compact disk, a Blu-ray (registered trademark) disk, and a DVD.

The "unit" of the data generation unit 201, the reception unit 202, the input unit 203, the transmission unit 204, the reception unit 301, the data storing unit 302, the transmission unit 303, the reception unit 401, the seed generation unit 402, the seed storing unit 403, the random-number generation unit 404, the data scrambling unit 405, the transmission unit 406, the input unit 501, the transmission unit 502, the reception unit 503, the seed storing unit 504, the random-number restoration unit 505, the analysis unit 506, and the output unit 507 can be replaced with "circuit", "step", "procedure", or "process".

The data generation device 200, the data accumulation device 300, the data scrambling device 400, and the data analysis device 500 can be realized by an electronic circuit such as a logic IC (Integrated Circuit), a GA (Gate Array), an ASIC (Application Specific Integrated Circuit), and an FPGA (Field-Programmable Gate Array).

The processors and the electronic circuit described above are also collectively referred to as processing circuitry.

REFERENCE SIGNS LIST

100: privacy protection system, 200: data generation device, 201: data generation unit, 202: reception unit, 203: input unit, 204: transmission unit, 211: processor, 212: storage device, 213: reception interface, 214: transmission interface, 215: input interface, 300: data accumulation device, 301: reception unit, 302: data storing unit, 303: transmission unit, 311: processor, 312: storage device, 313: reception interface, 314: transmission interface, 400: data scrambling device, 401: reception unit, 402: seed generation unit, 403: seed storing unit, 404: random-number generation unit, 405: data scrambling unit, 406: transmission unit, 411: processor, 412: storage device, 413: reception interface, 414: transmission interface, 500: data analysis device, 501: input unit, 502: transmission unit, 503: reception unit, 504: seed storing unit, 505: random-number restoration unit, 506: analysis unit, 507: output unit, 511: processor, 512: storage device, 513: reception interface, 514: transmission interface, 515: input interface, 516: output interface

The invention claimed is:

1. A concealment device comprising:
processing circuitry to:
generate a plurality of random numbers from a plurality of seeds;
conceal concealment target data which is a concealment target by adding, to each of a plurality of data values in the concealment target data, a sum of the plurality of random numbers generated; and
transmit concealed data which is the concealment target data concealed to a data analysis device that is equipped to:
restore, from each inputted seed, a same random number as a random number generated by the processing circuitry from the inputted seed, and
subtract, from each of the plurality of data values in the concealed data, the restored random number; and
transmit each seed among the plurality of seeds to the data analysis device.

2. The concealment device according to claim 1, wherein the processing circuitry generates the plurality of random numbers by applying a random-number generation algorithm to the plurality of seeds, and
transmits the concealed data to the data analysis device that can restore the same random number as the random number generated by the processing circuitry by applying the random-number generation algorithm to the corresponding seed.

3. The concealment device according to claim 1, wherein the processing circuitry transmits each seed among the plurality of seeds to the data analysis device, when a seed disclosure request is made from the data analysis device after transmission of the concealed data to the data analysis device and disclosure of a seed is approved by a determination device that performs determination whether or not to approve the disclosure of the seed.

4. The concealment device according to claim 3, wherein the processing circuitry generates K (K≥2) random numbers by using K seeds, and
transmits to the data analysis device, a seed which has not been transmitted to the data analysis device, every time a seed disclosure request is made from the data analysis device and the determination device approves the disclosure of the seed, until total number of transmissions of seeds to the data analysis device becomes (K−1).

5. The concealment device according to claim 1, wherein the processing circuitry conceals power usage data indicating an aggregate value of power consumption of a plurality of devices as the concealment target data by using the plurality of random numbers, and
generates the plurality of random numbers by using maximum power consumption that can be caused by a device selected from among the plurality of devices as a target whose power consumption is concealed.

6. A data analysis device comprising:
processing circuitry to:
receive concealed data which has been concealed by a concealment device by adding, to each of a plurality of data values of concealment target data to be concealed, a sum of a plurality of random numbers generated from a plurality of seeds, from the concealment device;
receive each seed from among the plurality of seeds, from the concealment device;
restore each random number among the plurality of random numbers from the corresponding seed received; and
subtract each restored random number from each of the plurality of data values in the concealed data.

7. The data analysis device according to claim 6, wherein the processing circuitry restores each random number among the plurality of random numbers by applying a random-number generation algorithm applied when the concealment device generates the plurality of random numbers from the plurality of seeds to the seed received.

8. The data analysis device according to claim 6 wherein the processing circuitry transmits a seed disclosure request for requesting disclosure of a seed to a determination device that performs determination whether or not to approve disclosure of the seed, and
receives a seed among the plurality of seeds from the concealment device, when the determination device approves disclosure of a seed.

9. The data analysis device according to claim 8, wherein the processing circuitry repeats transmission of the seed disclosure request to the determination device, and
repeats reception of a seed from the concealment device.

10. The data analysis device according to claim 6, wherein the processing circuitry receives the concealed data acquired by concealing power usage data indicating an aggregate value of power consumption of a plurality of devices, by using the plurality of random numbers generated by using maximum power consumption that can be caused by a device selected from the plurality of devices as a target whose power consumption is concealed.

11. A non-transitory computer readable medium storing a concealment program that causes a computer to execute:
a random-number generation process to generate a plurality of random numbers from a plurality of seeds;

a concealment process to conceal concealment target data which is a concealment target by adding, to each of a plurality of data values in the concealment target data, a sum of the plurality of random numbers generated by the random-number generation process; and a transmission process to transmit concealed data which is the concealment target data concealed by the concealment process to a data analysis device that is equipped to:

restore, from each inputted seed, a same random number as a random number generated by the processing circuitry from the inputted seed, and subtract, from each of the plurality of data values in the concealed data, the restored random number; and transmit any seed among the plurality of seeds to the data analysis device.

12. A non-transitory computer readable medium storing a data analysis program that causes a computer to execute:

a data reception process to receive, concealed data which has been concealed by a concealment device by adding, to each of a plurality of data values of concealment target data to be concealed, a sum of a plurality of random numbers generated from a plurality of seeds, from the concealment device;

a seed reception process to receive each seed among the plurality of seeds, from the concealment device;

a random-number restoration process to restore each random number among the plurality of random numbers from the corresponding seed received by the seed reception process; and an analysis process to subtract each restored random number from each of the plurality of data values in the concealed data.

\* \* \* \* \*